United States Patent
Hussain et al.

(10) Patent No.: US 11,450,968 B1
(45) Date of Patent: Sep. 20, 2022

(54) HIGHLY MINIATURIZED FOLDED-SLOT BASED MIMO ANTENNA DESIGN FOR CUBESAT APPLICATIONS

(71) Applicant: KING FAHD UNIVERSITY OF PETROLEUM AND MINERALS, Dhahran (SA)

(72) Inventors: Rifaqat Hussain, Dhahran (SA); Sheikh Sharif Iqbal, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 17/825,025

(22) Filed: May 26, 2022

(51) Int. Cl.
| | |
|---|---|
| H01Q 13/16 | (2006.01) |
| H01Q 5/55 | (2015.01) |
| H04B 7/0413 | (2017.01) |
| H01Q 13/02 | (2006.01) |
| H01Q 1/38 | (2006.01) |

(Continued)

(52) U.S. Cl.
CPC .............. *H01Q 13/16* (2013.01); *H01Q 1/288* (2013.01); *H01Q 1/38* (2013.01); *H01Q 5/55* (2015.01); *H01Q 13/0233* (2013.01); *H01Q 13/103* (2013.01); *H01Q 21/0006* (2013.01); *H01Q 21/0087* (2013.01); *H01Q 21/28* (2013.01); *H04B 7/0413* (2013.01)

(58) Field of Classification Search
CPC .......... H01Q 1/288; H01Q 1/38; H01Q 13/10; H01Q 13/103; H01Q 13/106; H01Q 13/16; H01Q 13/18; H01Q 21/28; H01Q 21/0006; H01Q 21/0087
See application file for complete search history.

(56) References Cited

U.S. PATENT DOCUMENTS

| | | | | |
|---|---|---|---|---|
| 5,754,143 A | * | 5/1998 | Warnagiris | H01Q 9/14 343/895 |
| 2010/0225553 A1 | | 9/2010 | Minard et al. | |

(Continued)

OTHER PUBLICATIONS

Hussain, et al.; 4-Element Concentric Pentagonal Slot-Line-Based Ultra-Wide Tuning Frequency Reconfigurable MIMO Antenna System; IEEE Transactions on Antennas and Propagation; May 23, 2018; 6 Pages.

(Continued)

*Primary Examiner* — Robert Karacsony
(74) *Attorney, Agent, or Firm* — Oblon, McClelland, Maier & Neustadt, L.L.P.

(57) ABSTRACT

A miniaturized folded slot-based multiple-input-multiple-output (MIMO) antenna operating in the ultra high frequency (UHF) band for use in CubeSats. The MIMO antenna includes a circuit board having a front side and a back side separated by a dielectric material, a metallic coating covering the front side where the metallic coating is folded over a first edge and covers a first portion of the back side and is folded over a second edge and covers the second portion of the back side. A first meandering slot line is configured as a first antenna and a second meandering slot line is configured as a second antenna; a first metallic feed horn and a second metallic feed horn feed the first antenna and the second antenna, respectively. The antennas include a plurality of capacitors to tune a first resonance frequency of the first antenna and a second resonance frequency of the second antenna.

20 Claims, 9 Drawing Sheets

(51) Int. Cl.
    *H01Q 21/00*      (2006.01)
    *H01Q 13/10*      (2006.01)
    *H01Q 21/28*      (2006.01)
    *H01Q 1/28*      (2006.01)

(56) References Cited

U.S. PATENT DOCUMENTS

2017/0012362 A1*   1/2017   Murch ................. H01Q 13/106
2021/0083375 A1    3/2021   Lilja

OTHER PUBLICATIONS

Kaushik, et al. ; Meander Line based Two Port MIMO small Antenna for UHF RFID and Sub-6 GHz Applications ; 2021 IEEE International Conference on RFID Technology and Applications ; Nov. 30, 2021 ; Abstract Only ; 3 Pages.

Aruna, et al. ; A very small Dual-Band MIMO Slot Antenna for WLAN and Wi MAX Applications ; Journal of Electronics and Communication Engineering, vol. 13, Issue 6, Ver. 1 I pp. 39-45 ; Dec. 21, 2018 ; 7 Pages.

Simon, et al. ; A Second-Iteration Square Koch Fractal Slot Antenna for UHF Downlink Telemetry Applications in CubeSat Small Satellite s ; International Journal of Antennas and Propagation, vol. 2020 ; Oct. 9, 2020 ; 10 Pages.

* cited by examiner

HIGHLY MINIATURIZED FOLDED-SLOT BASED MIMO ANTENNA DESIGN FOR CUBESAT APPLICATIONS

BACKGROUND

Technical Field

The present disclosure is directed to a highly miniaturized folded-slot based MIMO antenna design for CubeSat applications.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The introduction and expansion of various wireless services has resulted in a surge in frequency demand. In particular, as quality of multimedia content has increased, resulting demands for transmission capacity multimedia content have also increased, leading to the need for high-speed wireless communication to transmit large quantities of data. In an example, satellite communication is a high-speed wireless communication field which requires high transmission capacity.

Traditional satellite systems are relatively large in physical size and complex in operation. However, recent developments have led to smaller, lightweight, and simplified satellite systems, such as pico-class satellites or cube satellites (CubeSats). CubeSats have gained widespread popularity due to their miniaturized size and economic benefits over traditional satellites. CubeSats are economical and easy to manufacture as compared to the traditional satellite systems. After deployment, the vital function of the CubeSat is to establish and maintain communications with one or more ground or orbital locations. For performing various functions, a CubeSat includes one or more transceiver antennas to support the communications. In satellite systems, antenna design is a key component for both upstream and downstream communication that connects ground stations with satellites. The CubeSat has more stringent limitations on antenna design due to power constraints that govern the operational frequency and size constraints that define the design space. Low frequency and compact size requirements of CubeSat antennas pose several challenges to complying with standards set for CubeSat. A compact antenna is required which maintains basic antenna characteristics, such as input impedance matching, bandwidth, and peak gain requirements.

Conventionally, several miniaturization techniques have emerged that include meandering line structures, fractal slots, defective ground plane structures, capacitive and inductive loads, substrates with high dielectric constant, and metamaterials. To operate in the UHF band, a square Koch fractal slot antenna was developed, having dimensions of 56×56 mm$^2$. Slot-based antennas may be designed for ultra-high and microwave frequencies. Slot-based antennas are popular for CubeSat applications because of their low-profile structure, ease of fabrication, and compatibility with other electronic circuits. Further, a circularly polarized slot antenna can be wrapped and mounted on the CubeSat, thus forming a loop meander-line. The adjustment of the meander portions plays an important role in tuning the desired frequency for communication. Additionally, a microstrip patch antenna is known as a planar antenna option for nano-satellite, pico-satellite, and CubeSat. However, due to the size complexities and mounting specifications on the CubeSat, the solar cells of the CubeSat were covered by the microstrip patch antenna, affecting the power generating efficiencies of the CubeSat.

To overcome such problems, folded-slot antennas have been proposed. These folded-slot antennas are small in size, light in weight, easy to integrate, can be mass-produced easily, and can be made into various shapes. They have excellent compatibility with integrated circuits and have a wide operating bandwidth. However, a conventional folded-slot antenna is difficult to apply to an ultra wide band (UWB) having a bandwidth of 3 GHz or less.

Hence, there is a need for a miniaturized folded-slot based MIMO antenna that can operate in ultra wide band operation covering the frequency bands of CubeSats.

SUMMARY

In an exemplary embodiment, a miniaturized folded slot-based multiple-input-multiple-output (MIMO) antenna for ultra high frequency (UHF) bands is described. The miniaturized folded slot-based MIMO antenna includes a circuit board having a front side and a back side separated by a dielectric material, a first edge, a second edge parallel to and opposite the first edge, a third edge perpendicular to the first edge and the second edge, a fourth edge parallel to the third edge and opposite the third edge; a central axis parallel to the first edge, wherein the central axis bisects the front side such that the front side consists of a first region located between the first edge and the central axis and a second region located between the second edge and the central axis; a metallic coating covering the front side, a first portion of the back side and a second portion of the back side, wherein the metallic coating is folded over the first edge and covers the first portion and wherein the metallic coating is folded over the second edge and covers the second portion; a first meandering slot line formed in the metallic sheet between the central axis and the first end, wherein the first meandering slot line is configured as a first antenna; a second meandering slot line formed in the metallic coating between the central axis and the second end, wherein the second meandering slot line configured as a second antenna; a first metallic feed horn and a second metallic feed horn located on the back side in a gap region between the first edge and the second edge; and a plurality of capacitors configured to tune a first resonance frequency of the first antenna and a second resonance frequency of the second antenna.

In another exemplary embodiment, a method for making a miniaturized folded slot-based MIMO antenna is described. The method includes obtaining a dielectric circuit board of dimensions of less than or equal to 100×100 mm$^2$, the dielectric circuit board having a metallic coating on a front side, on a back side, on a first edge and on a second edge parallel to the first edge. The method further includes defining a central axis of the dielectric circuit board halfway between the first edge and the second edge. The method further includes defining a first region of the dielectric circuit board between the central axis and the first edge and located between a third edge perpendicular to the first edge and a fourth edge parallel to the third edge. The method further includes defining a second region of the dielectric circuit board between the central axis and the second edge and located between the third edge and the fourth edge. The method further includes forming, by a laser milling process, a first antenna having a first meandering slot line in the metallic coating, wherein the first meandering slot line begins at the central axis, extends over the first region and the first edge and onto the back side. The method further includes forming, by the laser milling process, a second antenna having a second meandering slot line in the metallic coating, wherein the second meandering slot line begins at the central axis, extends over the second region and the second edge and onto the back side. The method further includes forming, by the laser milling process, a first feed horn and a second feed horn surrounded by a gap region on the back side between the first meandering slot line and the second meandering slot line, wherein a horn end of the first feed horn points toward the first meandering slot line at a first end of the metallic coating, and a horn end of the second feed horn points toward the second meandering slot line at a second end of the metallic coating. The method further includes connecting a first feed line to the first feed horn. The method further includes connecting a second feed line to the second feed horn. The method further includes connecting a first capacitor to the metallic coating across a center leg of the first meandering slot line, wherein a capacitance of the first capacitor is selected to tune the first antenna to resonate at ultra high frequencies in a frequency range of 400 MHz to 550 MHz. The method further includes connecting a second capacitor to the metallic coating across a center leg of the second meandering slot line, wherein a capacitance of the second capacitor is selected to tune the second antenna to resonate at ultra high frequencies in the frequency range of 400 MHz to 550 MHz.

In another exemplary embodiment, a method for transmitting and receiving ultra high frequency (UHF) signals with a miniaturized folded slot-based multiple-input-multiple-output (MIMO) antenna is described. The method includes transmitting ultra high frequency (UHF) signals by applying the ultra high frequency (UHF) signals to a first feed horn and a second feed horn formed in a dielectric circuit board including: a front side and a back side separated by a dielectric, a first edge, a second edge parallel to and opposite the first edge, a third edge perpendicular to the first edge and the second edge, a fourth edge parallel to the third edge and opposite the third edge; a central axis parallel to the first edge, wherein the central axis bisects the front side such that the front side consists of a first region located between the first edge and the central axis and a second region located between the second edge and the central axis, a metallic coating covering the front side, a first portion of the back side and a second portion of the back side, wherein the metallic coating is folded over the first edge and covers the first portion and wherein the metallic coating is folded over the second edge and covers the second portion, a first meandering slot line formed in the metallic sheet between the central axis and the first end, wherein the first meandering slot line is configured as a first antenna, a second meandering slot line formed in the metallic coating between the central axis and the second end, wherein the second meandering slot line configured as a second antenna, a first metallic feed horn and a second metallic feed horn located on the back side in a gap region between the first edge and the second edge, and a plurality of capacitors configured to tune a first resonance frequency of the first antenna and a second resonance frequency of the second antenna; receiving the ultra high frequency signals by the first meandering slot and the second meandering slot, wherein the ultra high frequency signals cause the first antenna and the second antenna to resonate. The method further includes receiving the resonating signals of the first antenna by the first feed horn and receiving the resonating signals of the second antenna by the second feed horn. The method further includes generating first current signals by the first feed horn from the resonating signals of the first antenna. The method further includes generating second current signals by the second feed horn from the resonating signals of the second antenna.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
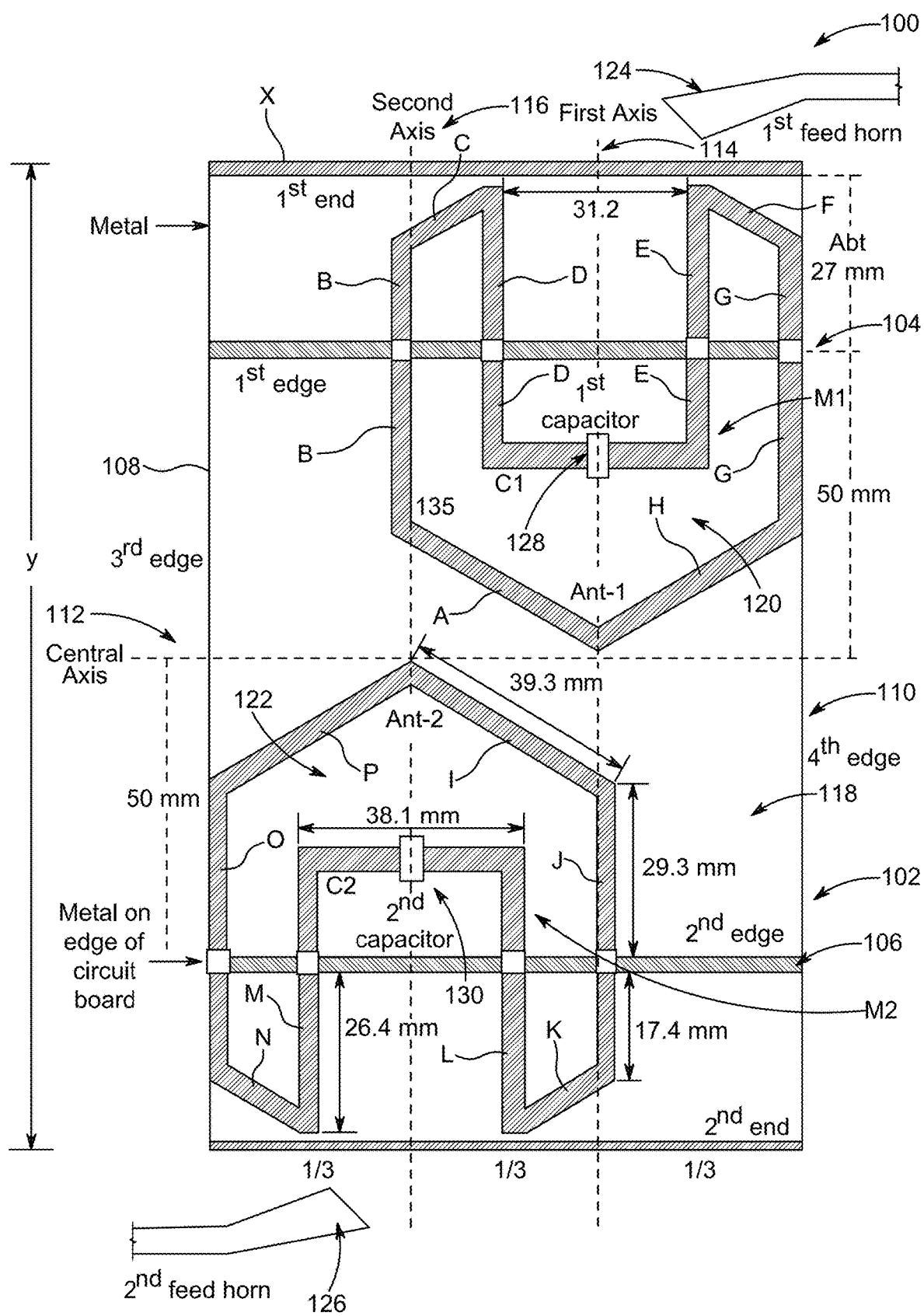
FIG. 1 is a schematic diagram of an unfolded state of a miniaturized folded slot-based multiple-input-multiple-output (MIMO) antenna, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

A meandering path is defined as a path which changes direction abruptly at points along the path.

Aspects of this disclosure are directed to a highly miniaturized folded slot-based multiple-input multiple-output (MIMO) antenna for Cube Satellites (CubeSats) applications in the UHF band (300 MHz to 3 GHz). The highly miniaturized folded slot-based MIMO antenna includes a meandering slot structure folded on both sides of a substrate board. Miniaturization of the MIMO antenna is achieved using a unique combination of the meandering slot with a folded structure along with reactive slot loading using a capacitor. The MIMO antenna exhibits wide-band operation, covering frequency bands from 430 MHz to 510 MHz. The MIMO antenna has a total board dimension less than or equal to $100 \times 100$ mm$^2$. The MIMO antenna is highly suitable for utilization in small satellites, especially for CubeSat applications.

Although the total dielectric circuit board dimensions in the exemplary embodiment are described as $100 \times 100$ mm$^2$, the total circuit board dimensions may be smaller, such as $75 \times 75$ mm$^2$, $50 \times 50$ mm$^2$ or $25 \times 25$ mm$^2$ as needed to meet design specifications or other considerations.

Figure 2A:
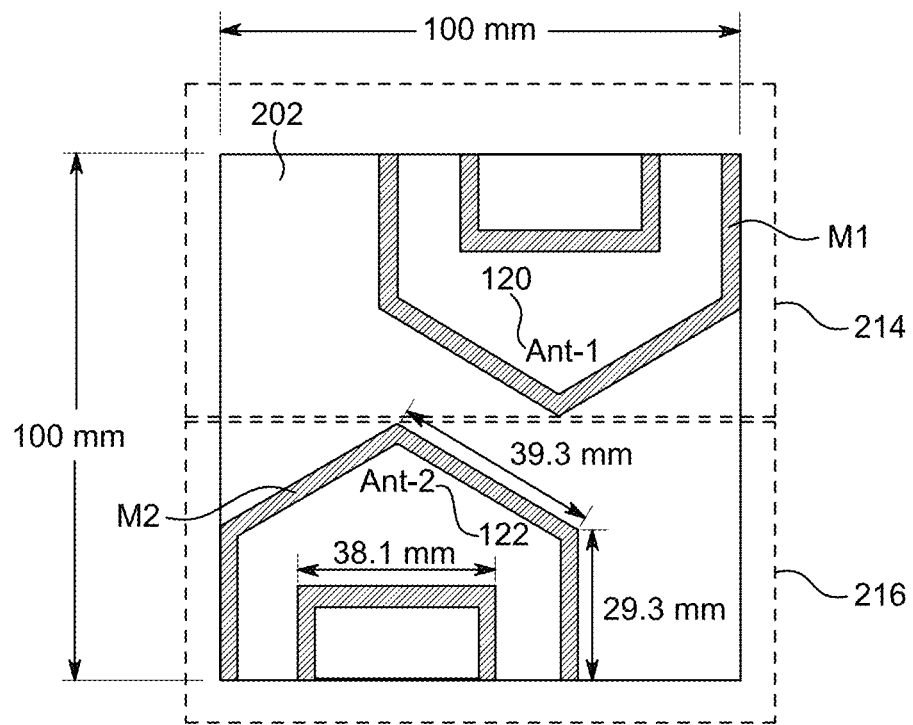
FIG. 2A is a top view of the miniaturized folded slot-based MIMO antenna, according to certain embodiments.
Figure 2B:
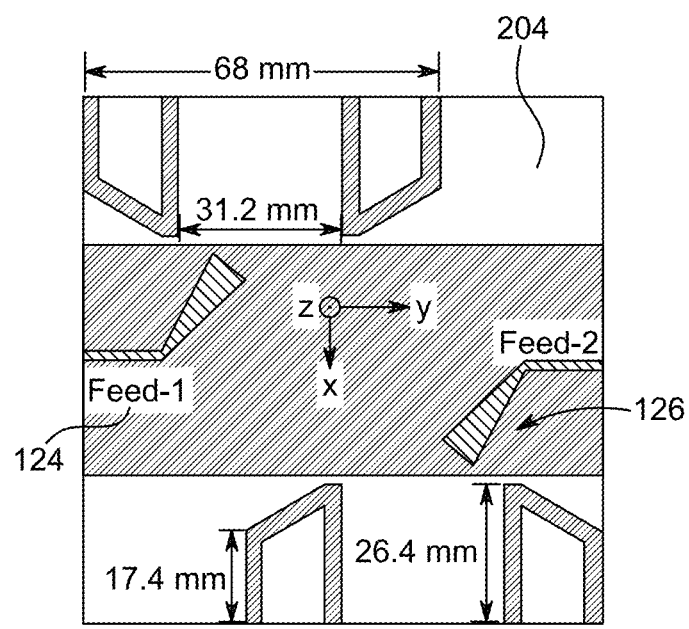
FIG. 2B is a bottom view of the miniaturized folded slot-based MIMO antenna, according to certain embodiments.
Figure 2C:
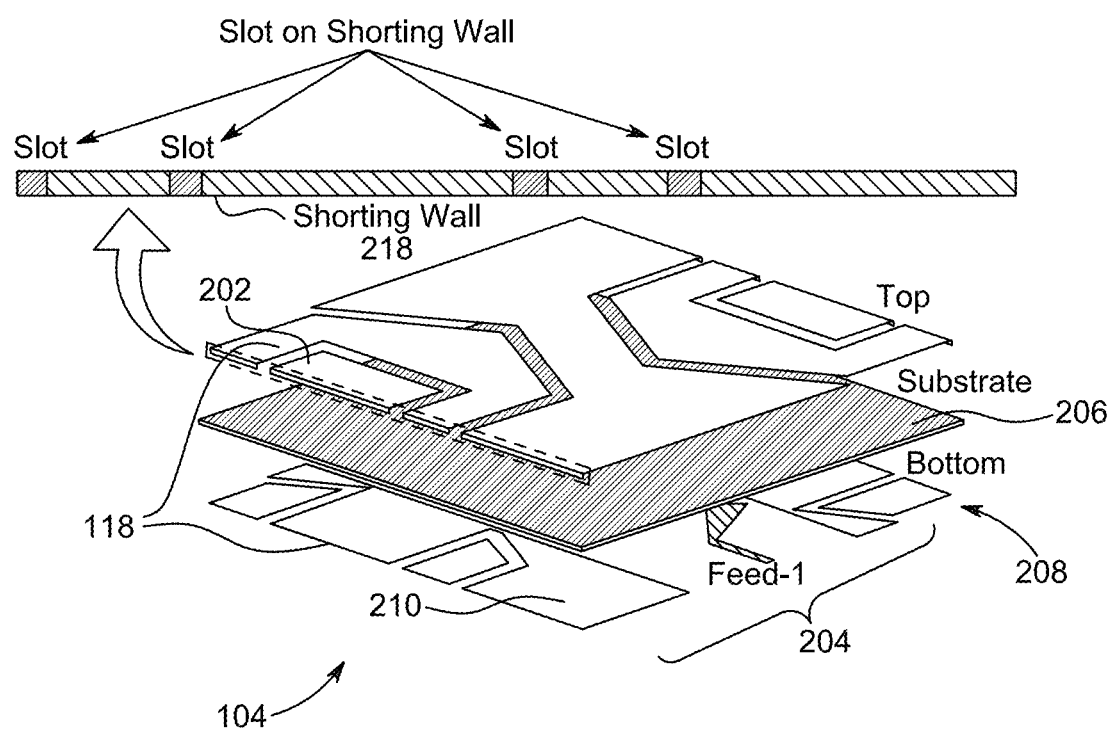
FIG. 2C illustrates various layers of the miniaturized folded slot-based MIMO antenna, according to certain embodiments.

FIG. 1-FIG. 2C illustrate an overall configuration of a miniaturized folded slot-based MIMO antenna.

FIG. 1 illustrates a schematic diagram of an unfolded state of the miniaturized folded slot-based MIMO antenna for ultra-high frequency (UHF) bands (hereinafter interchangeably referred to as "the MIMO antenna 100"), according to one or more aspects of the present disclosure. FIG. 1 may be read in conjunction with FIG. 2A-FIG. 2C for a better understanding. In the drawings of FIG. 1, and FIG. 2A-FIG. 2C, dimensions shown are for the example of a $100 \times 100$ mm$^2$ dielectric circuit board and should not be construed as limiting. For a dielectric circuit board less than $100 \times 100$ mm$^2$, the dimensions are proportionally smaller.

The MIMO antenna 100 includes a dielectric circuit board 102, a metallic coating 118, a first meandering slot line M1, a second meandering slot line M2, a first metallic feed horn 124, a second metallic feed horn 126, and a plurality of capacitors (128, 130).

The dielectric circuit board 102 includes a front side 202 and a back side 204 (shown in FIG. 2A), also referred to as the top side and the bottom side, respectively. The front side 202 and the back side 204 are separated by a dielectric 206 (shown in FIG. 2C). The dielectric circuit board 102 has a first edge 104, a second edge 106, a third edge 108, a fourth edge 110, and a central axis 112. The second edge 106 is parallel and opposite to the first edge (104. The third edge 108 is perpendicular to the first edge 104 and the second edge 106. The fourth edge 110 is parallel to the third edge 108 and opposite to the third edge 108. The central axis 112 is parallel to the first edge 104. The central axis 112 bisects the front side 202 such that the front side 202 includes two regions, named a first region 214 (shown in FIG. 2A), and a second region 216 (shown in FIG. 2A). The first region 208 is located between the first edge 104 and the central axis 112 and contains part of the first antenna 120. In the example of the $100 \times 100$ mm$^2$, the distance between the central axis 112 and the first edge 104 is 50 mm, and the length of the first region 208 is 50 mm. These dimensions may be proportionally smaller for a smaller dielectric circuit board. The second region 210 is located between the second edge 106 and the central axis 112 and contains part of the second antenna 122. In the example of the $100 \times 100$ mm$^2$, the distance between the central axis 112 and the second edge 106 is 50 mm, the length of the second region 210 is 50 mm. In some examples, the width (X) of the $100 \times 100$ mm$^2$ dielectric circuit board 102, parallel to the first edge 104, is less than or equal to 100 mm. Similarly, the length (Y) of the dielectric circuit board 102, parallel to the third edge 108, is less than or equal to 100 mm. The circuit board 102 further includes a first axis 114 and a second axis 116. The first axis 114 is perpendicular to the central axis 112 and extends from the first edge 104 to the second edge 106. Further, the first axis 114 is configured to bisect a center leg C1 of the first meandering slot line M1. The first meandering slot line M1 is mirror image symmetric about the first axis 114. The circuit board 102 also includes a second axis 116 in parallel to the first axis 114. The second axis 116 extends from the first edge 104 to the second edge 106. The second axis 116 is configured to bisect a center leg C2 of the second meandering slot line M2. The second meandering slot line M2 is mirror image symmetric about the second axis 116.

The metallic coating 118 covers the front side 202 fully and partially covers the back side 204. For example, the metallic coating 118 covers two portions of the back side 204, referred to as a first portion 208 of the back side 204 and a second portion 210 of the back side 204. The metallic coating 118 is folded over the first edge 104 of the circuit board 102 and covers the first portion 208 of the back side 204. In the example of the $100 \times 100$ mm$^2$ circuit board, the length of the covered first portion 208 is 27 mm. Also, the metallic coating 118 is folded over the second edge 106 of the circuit board 102 and covers the second portion 210 of the back side 204. In the example of the $100 \times 100$ mm$^2$ circuit board, the length of the covered second portion 210 is 27 mm.

To fabricate the antennas, the metallic coating 118, two layers of copper were coated on the circuit board. The meandered slot lines were etched into the metallic coating 118. The first edge 104 and the second edge 106 were covered with copper tape and the meandered slot lines were cut from the copper tape to continue the lines from the front side 202 to the back side 204.

In the metallic coating 118, two meandering slot lines (M1, M2) are formed. For example, the meandering slot lines (M1, M2) are fabricated on the metallic coating 118 using a laser etching and milling machine (See: LPKF Prototyping machine manufactured by LPKF Laser & Electronics, located at Osteriede 7, 30827 Garbsen, Germany). The first meandering slot line M1 is formed in the metallic coating 118 between the central axis 112 and the first end 132. The first meandering slot line M1 is configured to act as a first antenna 120. The first antenna 120 is configured to resonate at a signal frequency selected from a group of signal frequencies. For example, the signal frequencies are dependent on a value of capacitance of the first capacitor 128. By varying the capacitance of the first capacitor 128, the signal frequency may be changed, and as a result, the first antenna 120 is able to be tuned to different signal frequencies.

Further, the first meandering slot line M1 includes a first plurality of connected legs. For example, the first plurality of connected legs includes a first set of nine legs (A-H and the center leg) having a first leg (A), a second leg (B), a third leg (C), a fourth leg (D), the center leg (C1), a fifth leg (E), a sixth leg (F), a seventh leg (G), and an eighth leg (H).

In an exemplary connection implementation, the first leg (A) begins at an intersection of the central axis 112 and the first axis 114 in the first region 214. The first leg (A) extends at a first angle from the central axis 112 toward the second axis 116 and ends at the second axis 116. In an example, the first angle is 45 degrees.

The second leg (B) is connected to the first leg (A) at a second angle. In an example, the second angle is 135 degrees. The second leg (B) extends along the second axis 116, around the first edge 104, and towards the first end 132. Furthermore, the third leg (C) is connected to the second leg (B) at a third angle. In an example, the third angle is 135 degrees. The third leg (C) extends towards the first end 132. The fourth leg (D) is connected to the third leg (C) at a fourth angle. In an example, the fourth angle is 45 degrees. The fourth leg (D) extends away from the first end 132, around the first edge 104, and through the first region 214 towards the central axis 112 for a distance in the first region. The distance covered by the fourth leg (D) in the first region is equal to one-third of the distance between the first edge 104 and the central axis 112. The fourth leg (D) is parallel to the second leg (B) and is located halfway between the first axis 114 and the second axis 116.

The center leg (C1) of the first meandering slot (M1) is connected to the fourth leg (D) at a 90 degree angle. The center leg (C1) of the first meandering slot M1 extends towards the fourth edge 110 to a point that is equidistant between the fourth edge 110 and the first axis 114. In the example of the 100×100 mm² circuit board, the length of the center leg (C1) is 38.1 mm. The fifth leg (E) is connected to the center leg (C1) of the first meandering slot M1 at a 90 degree angle. The fifth leg (E) extends around the first edge 104 towards the first end 132. For example, a length of the fifth leg (E) is equal to a length of the fourth leg (D). In the example of the 100×100 mm² circuit board, the distance between the fourth leg (D) and the fifth leg (E) is 31.2 mm.

The sixth leg (F) is connected to the fifth leg (E) by a fifth angle, and the sixth leg (F) extends to the fourth edge 110. In an example, the fifth angle is 45 degrees. The seventh leg (G) is connected to the sixth leg (F) at a sixth angle. For example, the sixth angle is 135 degrees. The seventh leg (G) extends parallel to the fourth edge 110, around the first edge 104, towards the central axis 112 of the first meandering slot M1. In some examples, a length of the seventh leg (G) equals a length of the second leg (B). The eighth leg (H) is connected to the seventh leg (G) at a seventh angle. In an example, the seventh angle is 135 degrees. Further, the seventh leg (G) extends towards the first leg (A). The seventh leg (G) further connects with a beginning of the first leg (A), thereby providing a closed-loop first meandering slot line M1.

Similarly, the second meandering slot line M2 is formed in the metallic coating 118 between the central axis 112 and the second end 134. The second meandering slot line M2 is configured as a second antenna 122. The second antenna 122 is configured to resonate at a signal frequency selected from a group of signal frequencies. The signal frequencies are dependent on the value of capacitance of the second capacitor 130. By varying the capacitance of the second capacitor 130, the signal frequency may be changed. In this way, the second antenna 122 is able to tune to different signal frequencies.

Further, the second meandering slot line M2 includes a second plurality of connected legs. The second plurality of connected legs includes a second set of nine legs (I-P) includes a ninth leg (I), a tenth leg (J), an eleventh leg (K), a twelfth leg (L), a center leg C2, a thirteenth leg (M), a fourteenth leg (N), a fifteenth leg (O) and a sixteenth leg (P).

The ninth leg (I) is configured to begin at an intersection of the central axis 112 and the second axis 116 in the second region 216. Further, the ninth leg (I) extends at an eighth angle from the central axis 112 towards the first axis 114 and ends at the first axis 114. In an example, the eighth angle is 45 degrees. The tenth leg (J) is connected to the ninth leg (I) at a ninth angle. In an example, the ninth angle is 135 degrees. The tenth leg (J) is configured to extend along the second axis 116, around the second edge 106, and towards the second end 134.

The eleventh leg (K) is connected to the tenth leg (J) at a tenth angle. In an example, the tenth angle is 135 degrees. Further, the eleventh leg (K) extends towards the second end 134. The twelfth leg (L) is connected to the eleventh leg (K) at an eleventh angle. In an example, the eleventh angle is 45 degrees. The twelfth leg (L) extends away from the second end 134, around the second edge 106, and through the second region 216 towards the central axis 112 for a distance in the second region 216 equal to one-third of a distance in the second region 216 between the second edge 106 and the central axis 112. The twelfth leg (L) is parallel to the first axis 114 and located halfway between the first axis 114 and the second axis 116.

The center leg C2 of the second meandering slot M2 is connected to the twelfth leg (L) by a 90 degree angle. The center leg C2 of the second meandering slot M2 extends towards the third edge 108 to a point in the second region 216 equidistant between the third edge 108 and the second axis 116. In the example of the 100×100 mm² circuit board, the length of C2 is 38.1 mm and the distance between the fourth leg and the fifth leg is 31.2 mm. The thirteenth leg (M) is connected to the center leg C2 of the second meandering slot M2 by a 90 degree angle. The thirteenth leg (M) is configured to extend through the second region 216 around the second edge 106 towards the second end 134. In the example of the 100×100 mm² circuit board, the distance between the thirteenth leg (M) and the twelfth leg (L) is 31.2 mm. In an example, a length of the thirteenth leg (M) is equal to a length of the twelfth leg (L).

The fourteenth leg (N) is connected to the thirteenth leg (M) by a twelfth angle. The fourteenth leg (N) extends to the third edge 108. In an example, the twelfth angle is 45 degrees. The fifteenth leg (O) is connected to the fourteenth leg (N) at a thirteenth angle. Further, the fifteenth leg (O) extends parallel to the third edge 108, around the second edge 106, through the second region 216 towards the central axis 112. In an example, a length of the fifteenth leg (O) is equal to a length of the tenth leg (J). In an example, the thirteenth angle is 135 degrees. The sixteenth leg (P) is connected to the fifteenth leg (O) at a fourteenth angle. In some examples, the fourteenth angle is 135 degrees. The sixteenth (P) leg extends towards the ninth leg (I) and connects with a beginning of the ninth leg (I), thereby providing a closed loop second meandering slot line M2.

In some examples, the first antenna 120 and the second antenna 122 may act as a transmitting antenna or as a receiving antenna. In some cases, the first antenna 120 acts as the transmitting antenna, and the second antenna 122 acts as the receiving antenna. In some examples, each antenna may act as the transmitting antenna as well as the receiving antenna.

Further, the capacitors (128, 130) are configured to tune/generate a first resonance frequency of the first antenna 120 and a second resonance frequency of the second antenna 122. In an exemplary implementation, a first capacitor 128 is connected across the center leg C1 of the first meandering slot line M1. The first capacitor 128 is located across the center leg C1 of the first meandering slot M1 at an intersection with the first axis 114. Further, a second capacitor 130 is connected across the center leg C2 of the second meandering slot line M2. The second capacitor 130 is located across the center leg C2 of the second meandering slot M2 at an intersection with the second axis 116. In some examples, each of the first antenna 120 and the second antenna 122 is configured to resonate at signal frequencies in the range of 400 MHz to 550 MHz.

In some examples, the first capacitor 128 and the second capacitor 130 are 8 pF capacitors.

FIG. 2A is a top view of the front side 202 of the miniaturized folded slot-based MIMO antenna 100. The construction of miniaturized folded slot-based MIMO antenna 100 as shown in FIG. 2A is substantially similar to that of FIG. 1, and thus the construction is not repeated here in detail for the sake of brevity. For the example of the 100×100 mm$^2$ circuit board, as shown in FIG. 2A, the length of the ninth leg (L) is 39.3 mm, the length of the center leg C2 is 38.1, and the length of the tenth leg (M) is 29.3 mm. In an example, the circuit board 102 is a Rogers RO4350 substrate having a 1.6 mm thickness (fabricated by Roger cooperation, located at 2225 W Chandler Blvd, Chandler, Ariz. 85224). In an example, the circuit board 102 uses a substrate material having a relative permittivity ($\varepsilon_r$) of 3.48 and loss tangent of 0.0036. The selection of the dielectric material is not limited to 3.48, and any other material known in the art may be selected to act as a base material for designing an electronic circuit of the frequency reconfigurable miniaturized folded slot-based antenna 100. In some examples, the thickness of the dielectric material may be selected in the range of 1.5 mm-4 mm.

The dimensions of the circuit board 102 are less than or equal to 100×100 mm$^2$. The dimensions of FIGS. 1, 2A and 2C are based on a circuit board of 100×100 mm$^2$, and are merely exemplary. For a circuit board less than 100×100 mm$^2$, the dimensions are proportionally smaller.

In an example, the MIMO antenna 100 is fabricated using the LPKF machine (manufactured by LPKF Laser & Electronics, located at Osteriede 7, 30827 Garbsen, Germany) with a top layer (front side) and a bottom layer (back side) as shown in FIGS. 2A and B, respectively.

FIG. 2B illustrates the back side 204 of the MIMO antenna 100. As shown in FIG. 2B for the example of the circuit board of 100×100 mm$^2$, the length of the folded tenth leg, around the second edge, is 17.4 mm. As shown in FIG. 2B, the first metallic feed horn 124 and the second metallic feed horn 126 are located on the back side 204 in a gap region between the first edge 104 and the second edge 106. The first metallic feed horn 124 and the second metallic feed horn 126 are located between the first portion 208 and the second portion 210. The first metallic feed horn 124 and the second metallic feed horn 126 are configured to excite the first antenna 120, and the second antenna 122, respectively.

FIG. 2C illustrates various layers of the miniaturized folded slot-based MIMO antenna, according to certain embodiments. As shown in FIG. 2C, the MIMO antenna 100 includes three layers referred as a top layer (also referred to as the front side), a bottom layer (also referred to as the back side), and a substrate layer (also referred to as the dielectric). The top layer is the front side 202 of the circuit board 102. In an example, the top layer is made of metal. In an example, the metal is copper. The bottom layer refers to the back side 204 of the circuit board 102. In an example, the bottom layer is a combination of metal and dielectric. The substrate layer is made of dielectric material. In combination, the metallic layer extends over the shorting wall 218, which shows a plurality of slots. For example, there are 4 (four) slots formed on the shorting wall 216. The 4 (four) formed slots represent the 4 (four) legs are folded over the second edge 106. In similar way, 4 (four) slots are formed, on opposite side of the second edge, on the first edge 104 (not shown in FIG. 2C).

The slot width is 2 mm, which provides best input impedance matching with a strong resonance frequency.

Figure 3A:
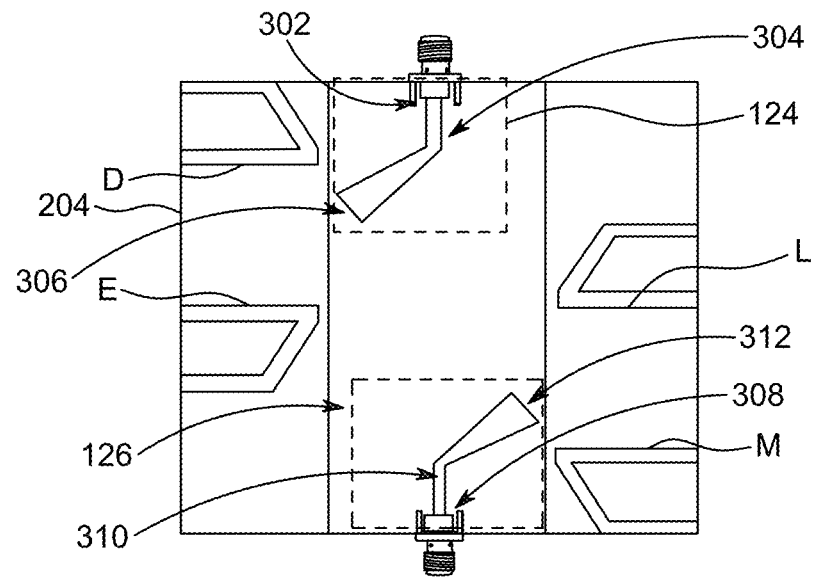
FIG. 3A illustrates a perspective view of feed horns placement on the bottom of the antenna, according to certain embodiments.

FIG. 3A is a perspective view of the metallic feed horns of the miniaturized folded slot-based MIMO antenna 100, according to certain embodiments. Each metallic feed horn is configured to couple a waveguide to, for example, a parabolic dish antenna or offset dish antenna for reception or transmission of microwave signals. The metallic feed horn minimizes the mismatch loss between the antenna and the waveguide. In an example, the metallic feed horn is a separate part configured to attach with the MIMO antenna 100 during installation. In some examples, the metallic feed horn is pre-fabricated/integrated with the MIMO antenna 100.

As shown in FIG. 3A, the first metallic feed horn 124 includes a first feed line 302, a first feed end 304, and a horn end 306. The first feed line 302 is connected to the fourth edge 110 in the gap region 212. The first feed end 304 of the first metallic feed horn 124 is connected to the first feed line 302. Further, the horn end 306 of the first metallic feed horn 124 is angled towards the first end 132. In an example, the horn end 306 of the first metallic feed horn 124 is configured to make an angle of 135 degrees with the first feed line 302. The horn end 306 of the first metallic feed horn 124 is pointed towards the first end 132 between the fourth leg (D) and the fifth leg (E).

In similar examples, the second metallic feed horn 126 includes a second feed line 308, a second feed end 310, and a horn end 312. The second feed line 308 is connected to the third edge 108 in the gap region 212. The second feed end 310 of the second metallic feed horn 126 is connected to the second feed line 308. The horn end 312 of the second metallic feed horn 126 is angled towards the second end 134. In an example, the horn end 312 of the second metallic feed horn 126 is configured to make an angle of 135 degrees with the second feed line 308. In some examples, the horn end 312 includes a plurality of side walls diverging outward from a first proximal end to a second distal end. In an example, the second metallic feed horn 126 is configured to make an angle of 135 degrees with the second feed line 308. Further, the horn end 312 of the second metallic feed horn 126 is pointed towards the second end 134 between the twelfth leg (L) and the thirteenth leg (M).

In an example, the length of the metallic input line of each feed horn is 20 mm and the width of the line is 1.72 mm. In an example, the feed horn is titled at an angle in the range of 42 degrees to 52 degrees with respect to an imaginary continuation of the metallic input line, or equivalently in the range of 128 degrees to 138 degrees with respect to the metallic input line.

In an operative mode, the metallic coating 118 of the MIMO antenna 100 is configured to transmit or receive frequency (RF) waves between two points in space. The MIMO antenna 100 is configured to either transmit a signal or receive a signal at a time. When the MIMO antenna 100 acts as a transmitting antenna, a voltage is applied to the transmitting antenna, the metallic coating 118 with the meandering slots is configured to generate radio signals which travel to a receiving antenna where the signal is converted back into electrical energy in the form of information.

When the MIMO antenna 100 is working as the receiving antenna, then a propagating electromagnetic field interacts with it. The propagating electromagnetic field generates a varying electric voltage signal at the center of the MIMO antenna 100. This voltage signal is an output when the antenna works as a receiver. The frequency of the output voltage signal is the same as the frequency of the receiving EM wave.

The ultra high frequency (UHF) signals are applied to the first metallic feed horn 124 and the second metallic feed horn 126 formed in the circuit board 102. The ultra high frequency (UHF) signals are transmitted by the ground stations towards the CubeSat.

In an operative example, when the MIMO antenna 100 acts as the receiving antenna, the first meandering slot M1 receives the ultra high frequency signals from the first metallic feed horn 124. The received ultra high frequency signals cause the first antenna to resonate and to generate first resonating signals. The first metallic feed horn 124 is configured to receive the first resonating signals of the first antenna 120 and generate first current signals.

In similar manner, the second meandering slot M2 receives the ultra high frequency signals from the second metallic feed horn 126. The received ultra high frequency signals cause the second antenna to resonate and generate second resonating signals. The second metallic feed horn 126 is configured to receive the second resonating signals of the second antenna 122 and generates second current signals.

Figure 3B:
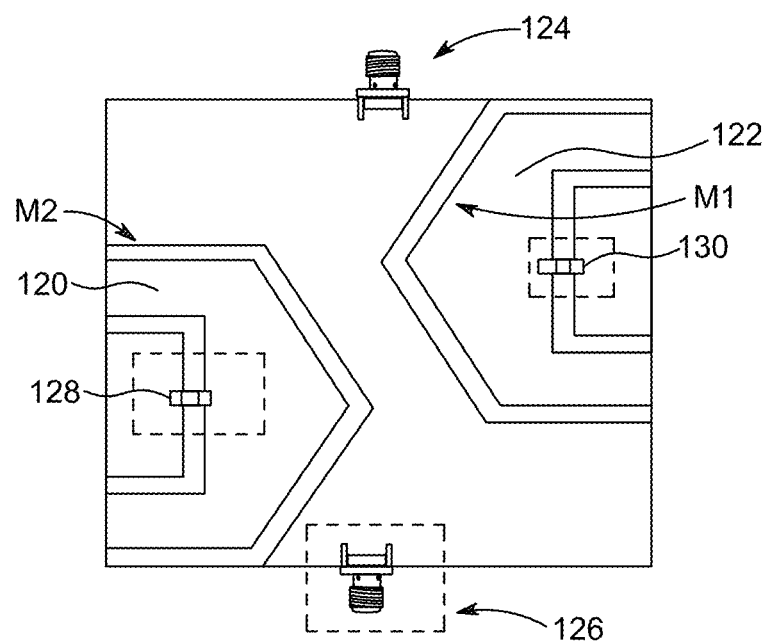
FIG. 3B is a top view of the feed line connections, according to certain embodiments.

FIG. 3B is a top view of the miniaturized folded slot-based MIMO antenna 100. The MIMO antenna 100 converts the electromagnetic fields to current in the antenna 100 (for example, during the reception) and current flowing through the antenna into electromagnetic fields (for example, during transmission). In the MIMO antenna 100, the back side 204 acts as a ground layer. The back side 204 is formed of a conductive metal such as copper and is connected to the ground when mounted on the transceiver. The metallic coating 118 is formed with the first meandering slot line M1 and the second meandering slot line M2, which are radiating members. In an example, an RF module is mounted on the circuit board 102 that is configured to generate a predetermined electric signal.

Figure 4:
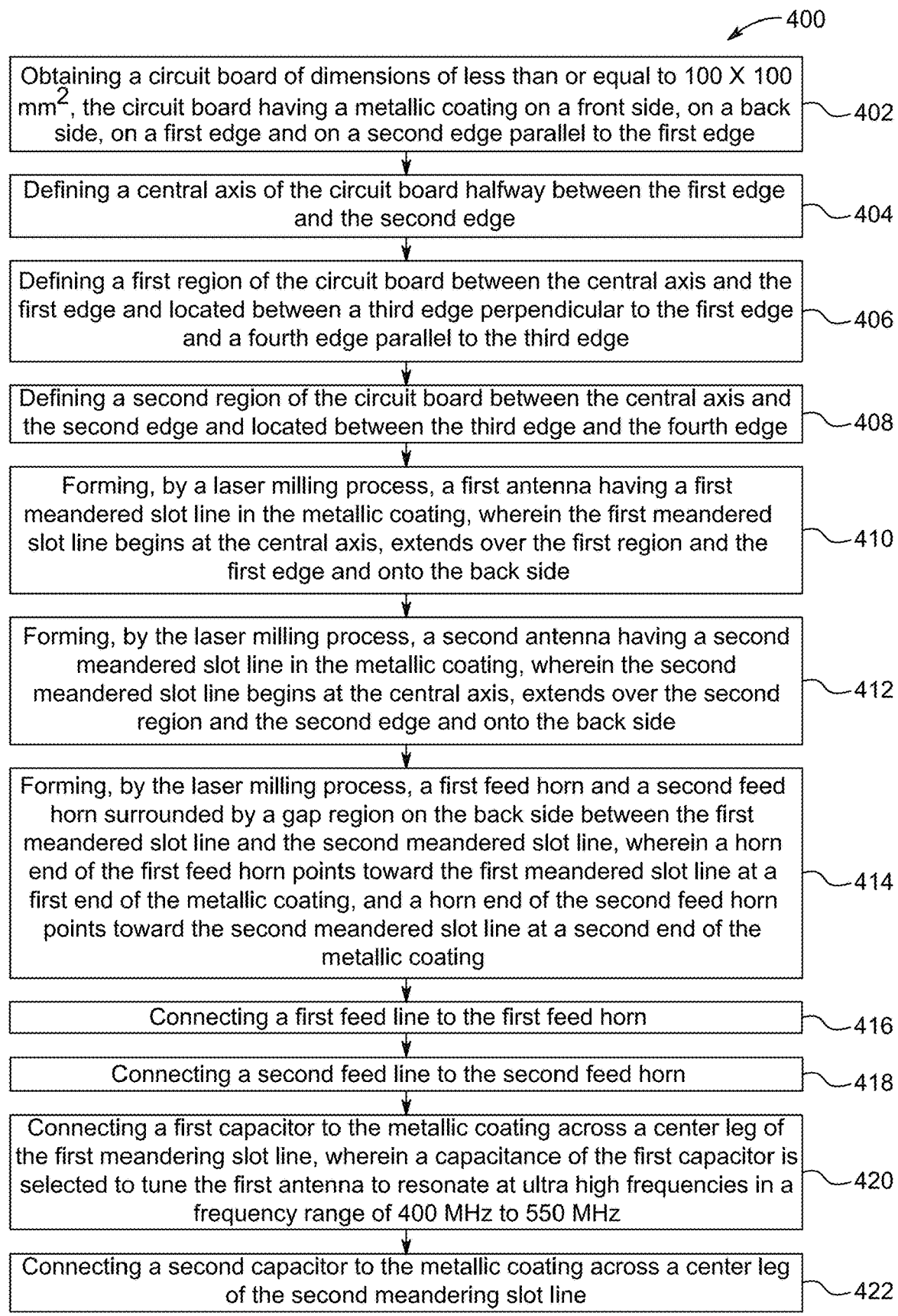
FIG. 4 is an exemplary flowchart of making a miniaturized folded slot-based MIMO antenna, according to certain embodiments.

FIG. 4 is an exemplary flowchart 400 of making a miniaturized folded slot-based MIMO antenna, according to certain embodiments.

Step 402 includes obtaining a circuit board 102 of dimensions of less than or equal to 100×100 mm². The circuit board 102 has a metallic coating 118 on a front side 202, on a back side 204, on a first edge 104, and on a second edge. The second edge 106 is parallel to the first edge 104.

Step 404 includes defining a central axis 112 of the circuit board 102 halfway between the first edge 104 and the second edge.

Step 406 includes defining a first region of the circuit board 102 between the central axis 112 and the first edge 104. The first region is located between a third edge 108 and a fourth edge 110. The third edge 108 is perpendicular to the first edge 104, and the fourth edge 110 is parallel to the third edge.

Step 408 includes defining a second region of the circuit board 102 between the central axis 112 and the second edge. The second region is located between the third edge 108 and the fourth edge 110.

Step 410 includes forming a first antenna having a first meandering slot line in the metallic coating 118 by a laser milling process. In an example, the first meandering slot line begins at the central axis 112, extends over the first region and the first edge 104, and onto the back side 204.

Step 412 includes forming a second antenna having a second meandering slot line M2 in the metallic coating 118 by the laser milling process. In an example, the second meandering slot line M2 begins at the central axis 112, extends over the second region and the second edge 106 and onto the back side 204.

Step 414 includes forming a first feed horn and a second metallic feed horn 126 surrounded by a gap region on the back side 204 between the first meandering slot line M1 and the second meandering slot line M2 by the laser milling process. In an example, a horn end of the first feed horn points toward the first meandering slot line M1 at a first end of the metallic coating 118. Further, a horn end of the second metallic feed horn 126 points toward the second meandering slot line M2 at a second end of the metallic coating 118.

Step 416 includes connecting a first feed line to the first metallic feed horn 124.

Step 418 includes connecting a second feed line to the second feed horn 126.

Step 420 includes connecting a first capacitor 128 to the metallic coating 118 across a center leg C1 of the first meandering slot line M1. In an example, a capacitance of the first capacitor 128 is selected to tune the first antenna to resonate at ultra high frequencies in a frequency range of 400 MHz to 550 MHz.

Step 422 includes connecting a second capacitor 130 to the metallic coating 118 across a center leg of the second meandering slot line. In an example, a capacitance of the second capacitor 130 is selected to tune the second antenna to resonate at ultra high frequencies in the frequency range of 400 MHz to 550 MHz.

The method 400 further includes a step of defining a first axis 114 of the circuit board 102 which is perpendicular to the central and extends from the first edge 104 to the second edge. In some examples, the first axis 114 is located one third of a distance from the third edge 108 to the fourth edge 110, between the third edge 108 and the central axis 112. Further, the first axis 114 bisects the center leg of the first meandering slot line M1.

The method 400 further includes a step of defining a second axis of the circuit board 102 which is parallel to the central axis 112 and extends from the first edge 104 to the second edge. In an example, the second axis is located two-thirds of the distance from the third edge 108 to the fourth edge 110, between the fourth edge 110 and the central axis 112. Further, the second axis bisects the center leg of the second meandering slot line M2.

The method 400 further includes a step of forming the first meandering slot line by forming a first set of nine legs. The first set of nine legs (A-H) includes a first leg (A), a second leg (B), a third leg (C), a fourth leg (D), a center leg (C1), a fifth leg (E), a sixth leg (F), a seventh leg (G), and an eighth leg (H). The first leg begins at an intersection of the central axis 112 and the first axis 114 in the first region. Further, the first leg extends at a first angle from the central axis 112 toward the second axis and ends at the second axis. The second leg is connected to the first leg at a second angle. The second leg extends along the second axis, around the first edge 104, and towards the first end of the metallic coating 118. The third leg is connected to the second leg at a third angle and the third leg extends towards the first end of the metallic coating 118. Further, the fourth leg is connected to the third leg at a fourth angle. The fourth leg extends away from the first end of the metallic coating 118, around the first edge 104, and through the first region towards the central axis 112 for a distance in the first region equal to one third of a distance between the first edge 104 and the central axis 112. The fourth leg is parallel to the second leg and located halfway between the first axis 114 and the second axis. The center leg of the first meandering slot is connected to the fourth leg by a 90 degree angle. The center leg of the first meandering slot extends towards the fourth edge 110 to a point equidistant between the fourth edge 110 and the first axis 114. Also, the fifth leg is connected to the center leg of the first meandering slot by a 90 degree angle. The fifth leg extends around the first edge 104 towards the first end of the metallic coating 118. A length of the fifth leg equals a length of the fourth leg. Further, the sixth leg is connected to the fifth leg by a fifth angle and the sixth leg extends to the fourth edge 110.

The seventh leg is connected to the sixth leg at a sixth angle. The seventh leg extends parallel to the fourth edge 110, around the first edge 104, towards the central axis 112 of the first meandering slot. The length of the seventh leg equals the length of the second leg. The eighth leg is connected to the seventh leg at a seventh angle, wherein the seventh leg extends towards the first leg and connects with a beginning of the first leg.

The second plurality of connected legs includes a second set of nine legs (I-P) includes a ninth leg (I), a tenth leg (J), an eleventh leg (K), a twelfth leg (L), a center leg (C2), a thirteenth leg (M), a fourteenth leg (N), a fifteenth leg (O) and a sixteenth leg (P).

The ninth leg begins at an intersection of the central axis 112 and the second axis in the second region. The ninth leg extends at an eighth angle from the central axis 112 towards the first axis 114 and ends at the first axis 114. The tenth leg is connected to the ninth leg at a ninth angle. Also, the tenth leg extends along the second axis, around the second edge, and towards the second end of the metallic coating 118. The eleventh leg is connected to the tenth leg at a tenth angle. The eleventh leg extends towards the second end of the metallic coating. The twelfth leg is connected to the eleventh leg at an eleventh angle, and the twelfth leg extends away from the second end of the metallic coating 118, around the second edge 106, and through the second region towards the central axis 112 for a distance in the second region equal to one third of a distance in the second region between the second edge 106 and the central axis 112. In an example, the twelfth leg is parallel to the first axis 114 and located halfway between the first axis 114 and the second axis. The center leg of the second meandering slot is connected to the twelfth leg by a 90 degree angle. Further, the center leg of the second meandering slot extends towards the third edge 108 to a point in the second region equidistant between the third edge 108 and the second axis. The thirteenth leg is connected to the center leg of the second meandering slot by a 90 degree angle. The thirteenth leg extends through the second region around the second edge 106 towards the second end of the metallic coating 118. In an example, a length of the thirteenth leg equals a length of the twelfth leg. The fourteenth leg is connected to the thirteenth leg by a twelfth angle and the fourteenth leg extends to the third edge.

The fifteenth leg is connected to the fourteenth leg at a thirteenth angle. The fifteenth leg extends parallel to the third edge, around the second edge, through the second region towards the central axis 112. In an example, a length of the fifteenth leg equals a length of the tenth leg. Further, the sixteenth leg is connected to the fifteenth leg at a fourteenth angle. The sixteenth leg extends towards the ninth leg and connects with a beginning of the ninth leg.

Although the antenna is described in the embodiments as having antenna dimension of 100×100 mm², the antenna may have dimensions smaller than 100×100 mm² with proportionally smaller leg lengths and widths.

Figure 5:
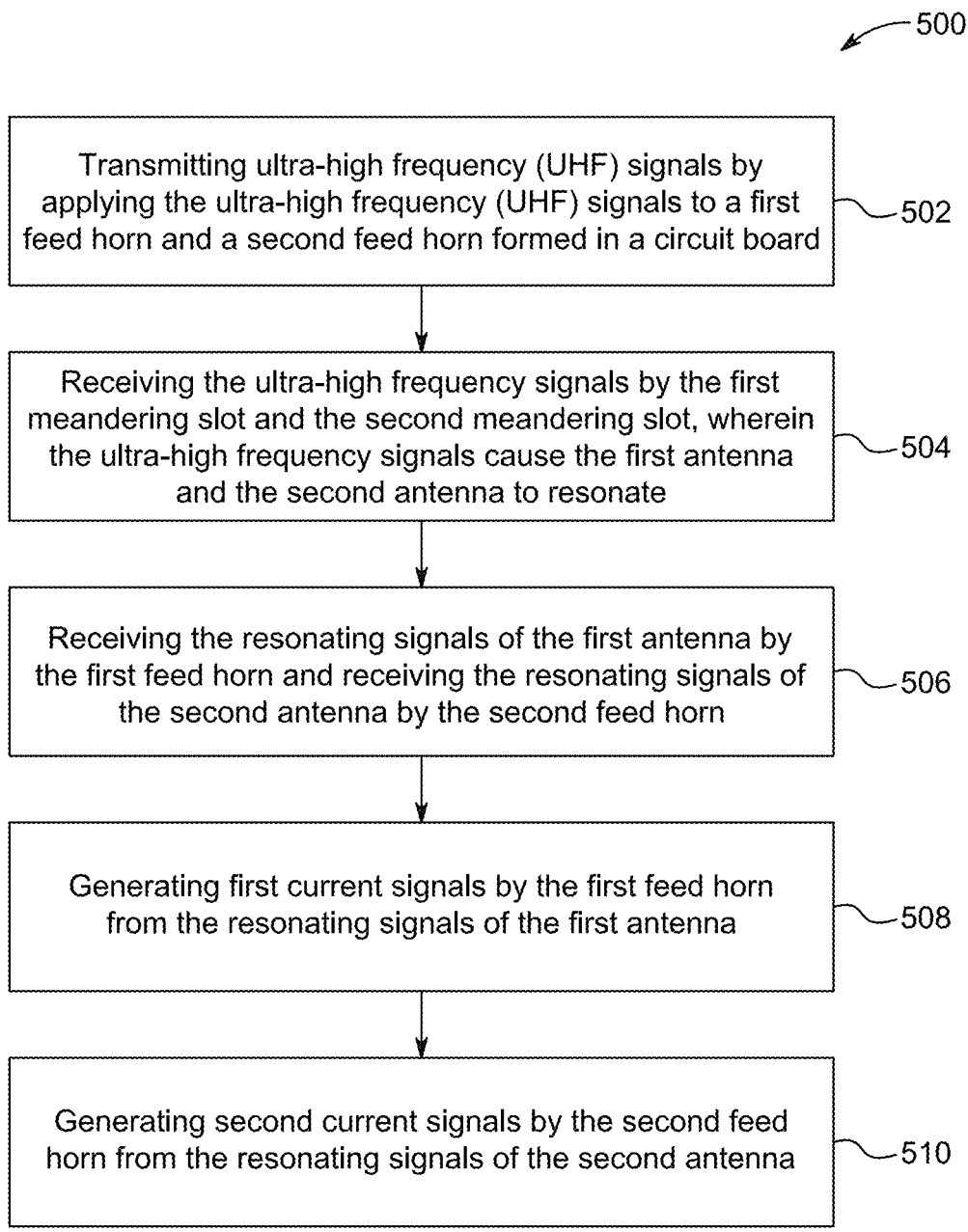
FIG. 5 is an exemplary flowchart of transmitting and receiving ultra high frequency (UHF) signals with a miniaturized folded slot-based MIMO antenna, according to certain embodiments.

FIG. 5 is an exemplary flowchart 500 of transmitting and receiving ultra high frequency (UHF) signals with a miniaturized folded slot-based MIMO antenna, according to certain embodiments.

Step 502 includes transmitting ultra high frequency (UHF) signals by applying the ultra high frequency (UHF) signals to a first feed horn and a second feed horn formed in a circuit board 102. The MIMO antenna includes a circuit board 102 having a front side 202 and a back side 204 separated by a dielectric, a first edge 104, a second edge 106 parallel to and opposite the first edge 104, a third edge 108 perpendicular to the first edge 104 and the second edge, a fourth edge 110 parallel to the third edge 108 and opposite the third edge; a central axis 112 parallel to the first edge 104, wherein the central axis 112 bisects the front side 202 such that the front side 202 consists of a first region located between the first edge 104 and the central axis 112 and a second region located between the second edge 106 and the central axis 112. Further, a metallic coating 118 covers the front side 202, a first portion of the back side 204 and a second portion of the back side 204. The metallic coating 118 is folded over the first edge 104 and covers the first portion, while the metallic coating 118 is folded over the second edge 106 and covers the second portion. The MIMO antenna 100 further includes a first meandering slot line M1 formed in the metallic sheet between the central axis 112 and the first end. The first meandering slot line M1 is configured as a first antenna. The MIMO antenna 100 further includes a second meandering slot line M2 formed in the metallic coating 118 between the central axis 112 and the second end. The second meandering slot line M2 is configured as a second antenna. The MIMO antenna further includes a first metallic feed horn 124 and a second metallic feed horn 126 located on the back side 204 in a gap region between the first edge 104 and the second edge. The MIMO antenna further includes a plurality of capacitors configured to tune a first resonance frequency of the first antenna and a second resonance frequency of the second antenna.

Steps 504-510 relate to receiving ultra high frequency (UHF) signals with a miniaturized folded slot-based MIMO antenna.

Step 504 includes receiving the ultra high frequency signals by the first meandering slot and the second meandering slot. The ultra high frequency signals cause the first antenna 120 and the second antenna 122 to resonate.

Step 506 includes receiving the resonating signals of the first antenna 120 by the first feed horn and receiving the resonating signals of the second antenna 122 by the second feed horn.

Step 508 includes generating first current signals by the first feed horn from the resonating signals of the first antenna 120.

Step 510 includes generating second current signals by the second feed horn from the resonating signals of the second antenna 122.

The following examples are provided to illustrate further and to facilitate the understanding of the present disclosure.

During experimentation, the MIMO antenna 100 was stimulated using HFSS (High Frequency Structure Simulator). The MIMO antenna 100 was fabricated using LPKF S104 (manufactured by LPKF Laser & Electronics, located at Osteriede 7, 30827 Garbsen, Germany). The fabricated MIMO antenna 100 was characterized for S-parameters using Agilent FieldFox RF Vector Network Analyzer (manufactured by Agilent Technologies, Inc., located at 5301 Stevens Creek Blvd. Santa Clara, Calif. 95051, United States of America). For example, the MIMO antenna 100 is a reactively loaded meandering folded slot structure. The simulated and measured s-parameters results are shown in FIGS. 6 and 7, respectively.

Figure 6:
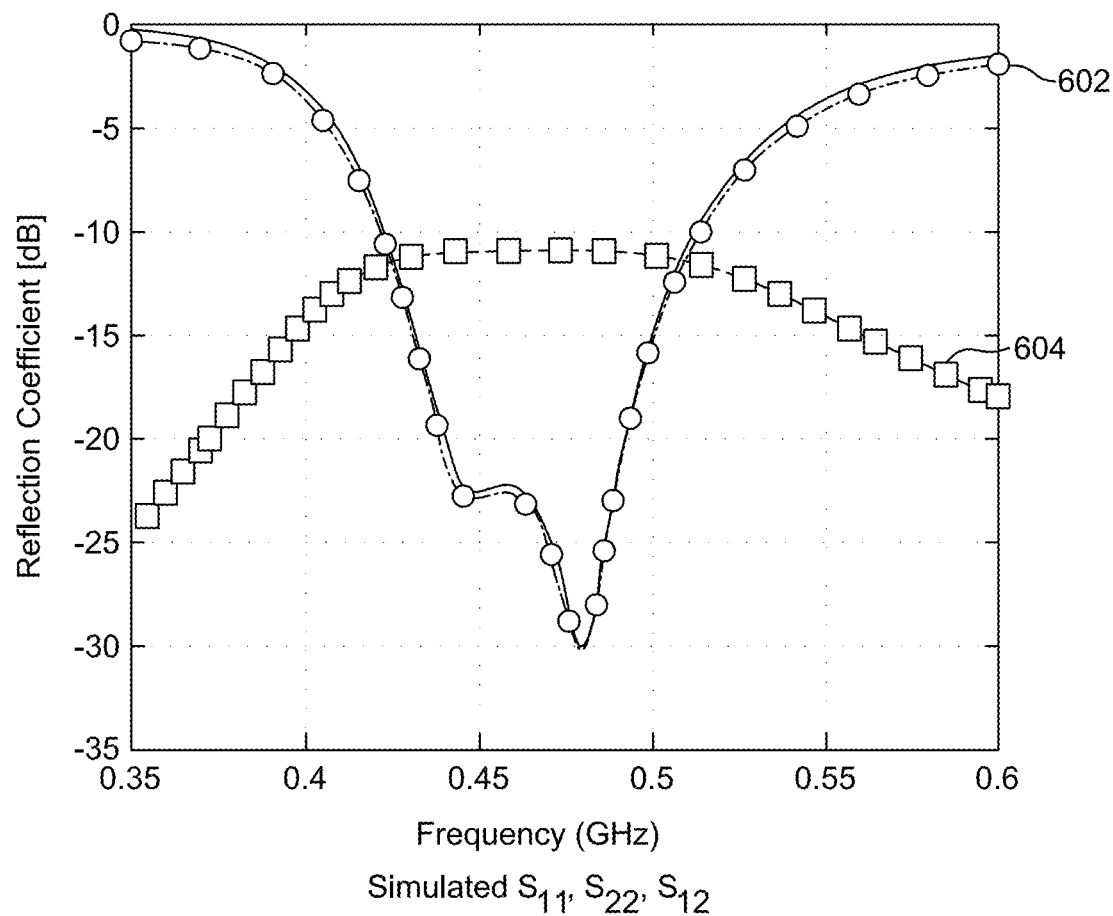
FIG. 6 is an illustration of simulated s-parameters results, according to certain embodiments.

FIG. 6 is an illustration of simulated s-parameters ($S_{11}$, $S_{22}$, $S_{12}$) results. The MIMO antenna 100 was designed to operate in UHF band. Most known planar antennas have limited bandwidth. However, the described MIMO antenna 100 exhibited simulated and measured −10 dB bandwidth of at least 95 MHz and 80 MHz, respectively. FIG. 6 shows the simulated S-curves curves for a capacitance value of 8 pF. Signal 602 represents the values of s-parameters ($S_{11}$, $S_{22}$). Further, signal 604 represents values of $S_{12}$. The MIMO antenna 100 may be tuned at other lower frequency bands by changing the capacitance values, thereby making the MIMO antenna 100 more flexible to tune at other bands.

Figure 7:
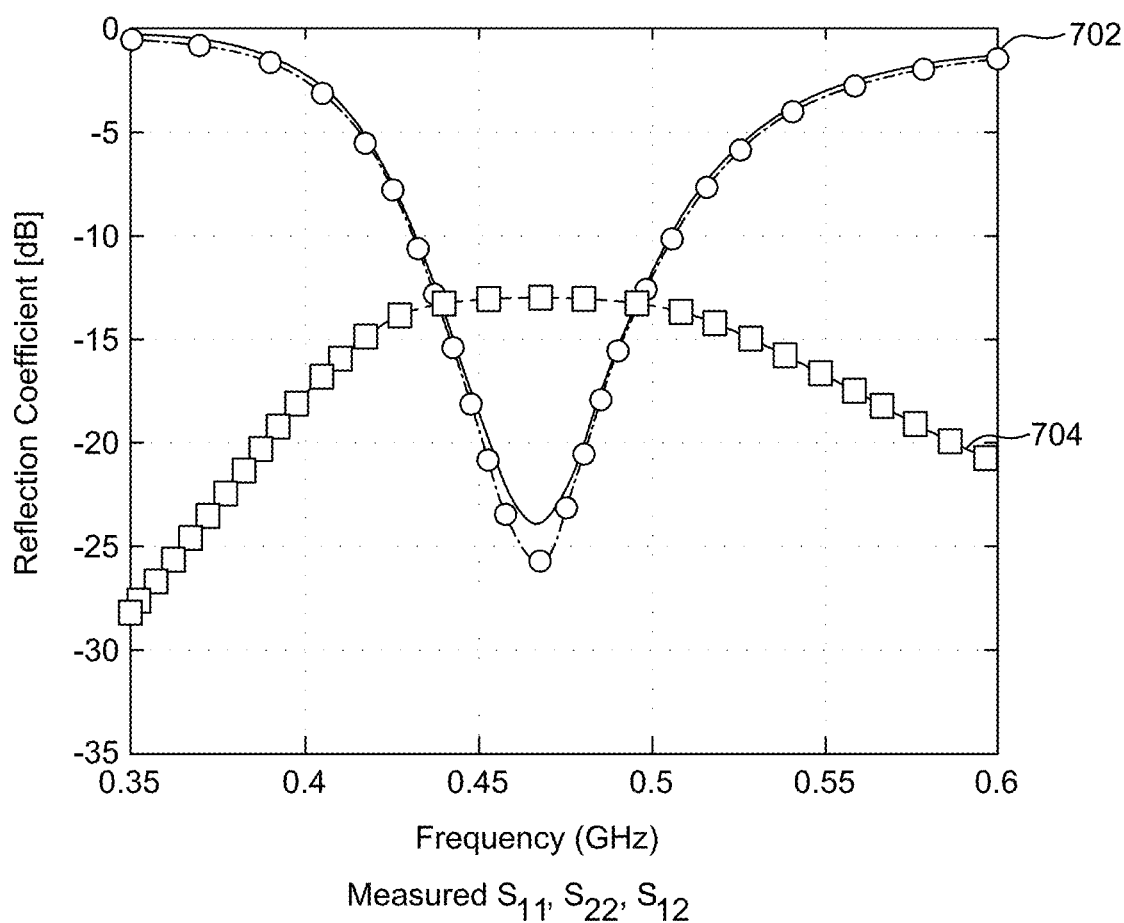
FIG. 7 is an illustration of measured s-parameters results, according to certain embodiments.

FIG. 7 is an exemplary illustration of measured s-parameters results. Signal 702 represents the values of $S_{11}$, $S_{22}$. Further, signal 704 represents values of $S_{12}$. As shown in FIG. 7, the measured results are in good agreement with the simulated results, as shown in FIG. 6. Good isolation values were also observed for both simulated and measured results.

For an antenna (s) for transmitting simultaneous and independent data streams, isolation is required between the antenna (s) such that each of antenna works independently without affecting other's performance. The antennas should have good isolation, and their radiation patterns should not be same, or at least not very "correlated". To measure the isolation between the antennas Envelope Correlation Coefficient (ECC) is calculated.

The ECC describes the independence of the two antenna's radiation patterns. For example, if one antenna is completely horizontally polarized, and the other is completely vertically polarized, then the two antennas would have a correlation of zero. In similar manner, if one antenna only radiated energy towards the sky, and the other only radiated energy towards the ground, these antennas would also have an ECC of 0. The ECC is considered as an important factor for accounting the antennas' radiation pattern shape, polarization, a relative phase of the fields between the two antennas.

Figure 8B:
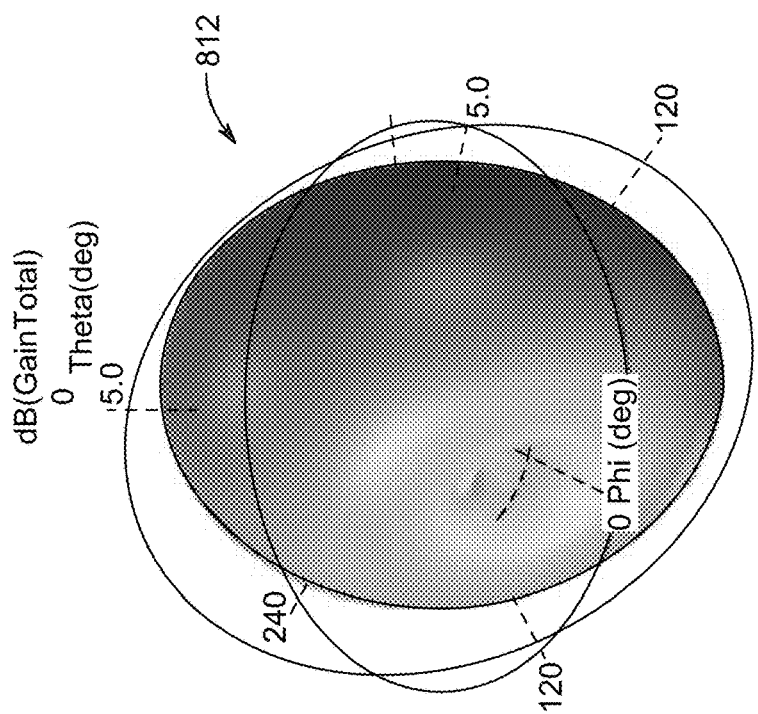
FIG. 8B is an illustration of 3-D gain pattern of the miniaturized folded slot-based MIMO antenna for the second antenna, according to certain embodiments.
Figure 8B:
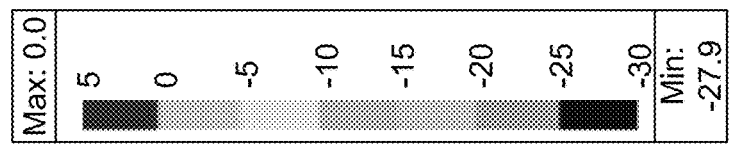
Figure 8A:
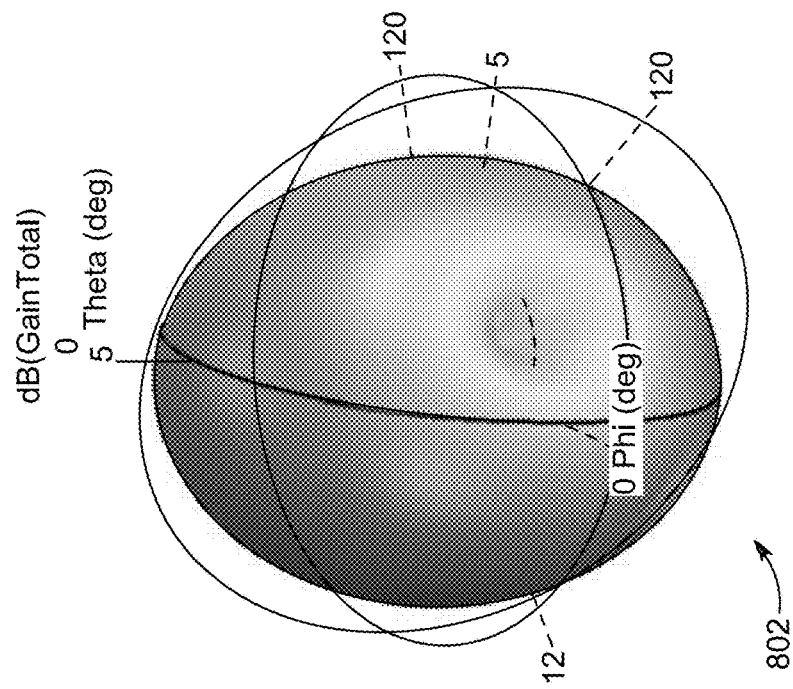
FIG. 8A is an illustration of 3-D gain pattern of the miniaturized folded slot-based MIMO antenna for the first antenna, according to certain embodiments.
Figure 8A:
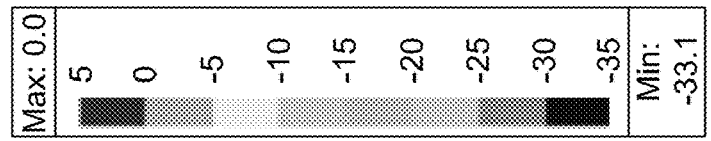

The folded-slot MIMO antenna 100 was characterized for its far-field radiation patterns and MIMO parameters. The peak gain and efficiency (% η) values were evaluated at 450 MHz. To understand the antenna's radiation pattern, in experimentation, the first antenna 120 and second antenna 122 were provided with input signals. FIG. 8A is an exemplary illustration of the 3-D gain pattern of the first antenna 120. To measure peak gain and the efficiency of the first antenna 120, a second port (second antenna 122) was terminated with 50-ohm load. Signal 802 indicates a gain pattern of the first antenna 120. Similarly, FIG. 8B is an exemplary illustration of the 3-D gain pattern of the second antenna 122. To measure peak gain and the efficiency of the second antenna 122, a first port (first antenna 120) was terminated with a 50-ohm load. Signal 812 indicates a gain pattern of the second antenna 122.

The 3-D gain patterns are shown in FIG. 8A and FIG. 8B for the two antennas, respectively with peak gain value of −1.8 dBi at 450 MHz. From the gain patterns, it is evident that both antennas (120, 122) radiated orthogonally which helped in reducing the field coupling between antenna elements. Moreover, ECC values were also computed for the proposed antenna design at 450 MHz. Due to the orientation of two antenna elements and its orthogonal direction of maximum gain, the described MIMO antenna 100 performed well for ECC values. The values were computed using field coupling between the 2-antenna elements. It has been observed that the ECC values are less than 0.5 over the entire bands of operation and hence good MIMO operation was ensured.

When used for multiple-input multiple-output (MIMO) antenna systems, reduced pattern correlation results in increased data rates. Additionally, having both antennas (120, 122) fabricated on a common substrate provides a low cost and accurate method of maintaining a specific antenna spacing and rotation angle between the two antennas such that isolation and correlation management can be as desired or optimized between the multiple antenna elements.

The compact meandering folded slot-based MIMO antenna 100 of the present disclosure is a 2-element antenna suitable for a 1-Unit CubeSat surface of 100×100 $mm^2$ or less. Miniaturization in the MIMO antenna 100 is obtained by using a meandering slot-line structure, and folding along with a capacitively loaded slot. The unique features of the MIMO antenna 100 are its planar structure, wide-band operation, and highly miniaturized antenna structure in MIMO configuration. Each folded slot has dimensions of 50×68 $mm^2$ (for a 100×100 $mm^2$ circuit board) and with operation over a wide-band from 430 MHz to 510 MHz.

The first embodiment is illustrated with respect to FIGS. 1-5. The first embodiment describes a miniaturized folded slot-based MIMO antenna 100 for UHF bands. The MIMO antenna 100 includes a circuit board 102 having the front side 202 and the back side 204 separated by the dielectric, the first edge 104, a second edge 106 parallel to and opposite the first edge 104, a third edge 108 perpendicular to the first edge 104 and the second edge, a fourth edge 110 parallel to the third edge 108 and opposite the third edge; a central axis 112 parallel to the first edge 104, wherein the central axis 112 bisects the front side 202 such that the front side 202 consists of a first region located between the first edge 104 and the central axis 112 and a second region located between the second edge 106 and the central axis 112; a metallic coating 118 covering the front side 202, a first portion of the back side 204 and a second portion of the back side 204, wherein the metallic coating 118 is folded over the first edge 104 and covers the first portion and wherein the metallic coating 118 is folded over the second edge 106 and covers the second portion; a first meandering slot line M1 formed in the metallic sheet between the central axis 112 and the first end, wherein the first meandering slot line M1 is configured as a first antenna; a second meandering slot line M2 formed in the metallic coating 118 between the central axis 112 and the second end, wherein the second meandering slot line M2 configured as a second antenna; a first metallic feed horn 124 and a second metallic feed horn 126 located on the back side 204 in a gap region between the first edge 104 and the second edge 106; and a plurality of capacitors configured to tune a first resonance frequency of the first antenna 120 and a second resonance frequency of the second antenna 122.

In an aspect, a width of the circuit board 102 parallel to the first edge 104 is less than or equal to 100 mm, and a length of the circuit board 102 parallel to the third edge 108 is less than or equal to 100 mm.

The plurality of capacitors includes a first capacitor 128 connected across a center leg of the first meandering slot line M1, and a second capacitor 130 connected across a center leg of the second meandering slot line M2.

The first antenna 120 is configured to resonate at signal frequencies dependent on a capacitance of the first capacitor 128 and the second antenna 122 is configured to resonate at signal frequencies dependent on a capacitance of the second capacitor 130.

Each of the first antenna and the second antenna is configured to resonate at signal frequencies in the range of 400 MHz to 550 MHz.

In an aspect, the first capacitor 128 and the second capacitor 130 are variable capacitors.

In an aspect, the miniaturized folded slot-based MIMO antenna 100 further includes a first feed line connected to the fourth edge 110 in the gap region, a feed end of the first feed horn connected to the first feed line; a second feed line connected to the third edge 108 in the gap region; a feed end of the second feed horn connected to the second feed line, a horn end of the first feed horn angled towards the first end; and a horn end of the second feed horn angled towards the second end.

In an aspect, the miniaturized folded slot-based MIMO antenna 100 further includes a first plurality of connected legs which form the first meandering slot line M1, and a second plurality of connected legs, which form the second meandering slot line M2.

In an aspect, the miniaturized folded slot-based MIMO antenna 100 further includes a first axis 114 of the circuit board 102 is perpendicular to the central axis and extending from the first edge 104 to the second edge, wherein the first axis 114 bisects the center leg of the first meandering slot line M1; and a second axis of the circuit board 102 parallel to the first axis 114 and extending from the first edge 104 to the second edge, wherein the second axis bisects the center leg of the second meandering slot line M2.

The first plurality of connected legs includes a first set of nine legs having a first leg which begins at an intersection of the central axis 112 and the first axis 114 in the first region, wherein the first leg extends at a first angle from the central axis 112 toward the second axis and ends at the second axis, a second leg connected to the first leg at a second angle, wherein the second leg extends along the second axis, around the first edge 104, and towards the first end; a third leg connected to the second leg at a third angle, wherein the third leg extends towards the first end; a fourth leg (4) connected to the third leg at a fourth angle, wherein the fourth leg extends away from the first end, around the first edge 104 and through the first region towards the central axis 112 for a distance in the first region equal to one third of a distance between the first edge 104 and the central axis 112, where the fourth leg is parallel to the second leg and located halfway between the first axis 114 and the second axis, the center leg of the first meandering slot connected to the fourth leg by a 90 degree angle, wherein the center leg of the first meandering slot extends towards the fourth edge 110 to a point equidistant between the fourth edge 110 and the first axis 114, a fifth leg connected to the center leg of the first meandering slot by a 90 degree angle, where the fifth leg extends around the first edge 104 towards the first end, wherein a length of the fifth leg equals a length of the fourth leg, a sixth leg connected to the fifth leg by a fifth angle, wherein the sixth leg extends to the fourth edge 110, a seventh leg connected to the sixth leg at a sixth angle, where the seventh leg extends parallel to the fourth edge 110, around the first edge 104, towards the central axis 112 of the first meandering slot, wherein a length of the seventh leg equals a length of the second leg, and an eighth leg connected to the seventh leg at a seventh angle, where the seventh leg extends towards the first leg and connects with a beginning of the first leg.

In an aspect, the first angle is 45 degrees, the second angle is 135 degrees, the third angle is 135 degrees, the fourth angle is 45 degrees, the fifth angle is 45 degrees, the sixth angle is 135 degrees and the seventh angle is 135 degrees.

In an aspect, the horn of the first feed horn makes an angle of 135 degrees with the first feed line and the horn end of the first feed horn is pointed towards the first end between the fourth and the fifth legs.

In an aspect, the first capacitor 128 is located across the center leg of the first meandering slot at an intersection with the first axis 114.

In an aspect, the second plurality of connected legs includes a second set of nine legs includes a ninth leg beginning at an intersection of the central axis 112 and the second axis in the second region, wherein the first leg extends at an eighth angle from the central axis 112 towards the first axis 114 and ends at the first axis 114, a tenth leg connected to the ninth leg at a ninth angle, wherein the tenth leg extends along the second axis, around the second edge, and towards the second end, an eleventh leg connected to the tenth leg at an tenth angle, wherein the eleventh leg extends towards the second end, a twelfth leg connected to the eleventh leg at an eleventh angle, wherein the twelfth leg extends away from the second end, around the second edge 106 and through the second region towards the central axis 112 for a distance in the second region equal to one third of a distance in the second region between the second edge 106 and the central axis 112, wherein the twelfth leg is parallel to the first axis 114 and located halfway between the first axis 114 and the second axis, the center leg of the second meandering slot connected to the twelfth leg by a 90 degree angle, wherein the center leg of the second meandering slot extends towards the third edge 108 to a point in the second region equidistant between the third edge 108 and the second axis, a thirteenth leg connected to the center leg of the second meandering slot by a 90 degree angle, wherein the fifth leg extends through the second region around the second edge 106 towards the second end, wherein a length of the thirteenth leg equals a length of the twelfth leg, a fourteenth leg connected to the thirteenth leg by a twelfth angle, wherein the fourteenth leg extends to the third edge, a fifteenth leg connected to the fourteenth leg at a thirteenth angle, wherein the fifteenth leg extends parallel to the third edge, around the second edge, through the second region towards the central axis 112, wherein a length of the fifteenth leg equals a length of the tenth leg, and a sixteenth leg connected to the fifteenth leg at a fourteenth angle, wherein the sixteenth leg extends towards the ninth leg and connects with a beginning of the ninth leg.

In an aspect, the eighth angle is 45 degrees, the ninth angle is 135 degrees, the tenth angle is 135 degrees, the eleventh angle is 45 degrees, the twelfth angle is 45 degrees, the thirteenth angle is 135 degrees, and the fourteenth angle is 135 degrees.

In an aspect, the horn of the second feed horn makes an angle of 135 degrees with the second feed line, and the horn end of the second feed horn is pointed towards the second end between the twelfth and the thirteenth legs.

In an aspect, the second capacitor 130 is located across the center leg of the second meandering slot at an intersection with the second axis.

The second embodiment is illustrated with respect to FIGS. 1-5. The second embodiment describes a method for making a miniaturized folded slot-based MIMO antenna 100. The method includes obtaining a circuit board 102 of dimensions of less than or equal to 100×100 mm$^2$, the circuit board 102 having a metallic coating 118 on a front side 202, on a back side 204, on a first edge 104, and on a second edge 106 parallel to the first edge 104. The method further includes defining a central axis 112 of the circuit board 102 halfway between the first edge 104 and the second edge. The method further includes defining a first region of the circuit board 102 between the central axis 112 and the first edge 104 and located between a third edge 108 perpendicular to the first edge 104 and a fourth edge 110 parallel to the third edge. The method further includes defining a second region of the circuit board 102 between the central axis 112 and the second edge 106 and located between the third edge 108 and the fourth edge 110. The method further includes forming, by a laser milling process, a first antenna having a first meandering slot line M1 in the metallic coating 118, wherein the first meandering slot line M1 begins at the central axis 112, extends over the first region and the first edge 104 and onto the back side 204. The method further includes forming, by the laser milling process, a second antenna having a second meandering slot line M2 in the metallic coating 118, wherein the second meandering slot line M2 begins at the central axis 112, extends over the second region and the second edge 106 and onto the back side 204. The method further includes forming, by the laser milling process, a first feed horn and a second feed horn surrounded by a gap region on the back side 204 between the first meandering slot line M1 and the second meandering slot line M2, wherein a horn end of the first feed horn points toward the first meandering slot line M1 at a first end of the metallic coating 118, and a horn end of the second feed horn points toward the second meandering slot line M2 at a second end of the metallic coating 118. The method further includes connecting a first feed line to the first feed horn. The method further includes connecting a second feed line to the second feed horn. The method further includes connecting a first capacitor 128 to the metallic coating 118 across a center leg of the first meandering slot line, wherein a capacitance of the first capacitor 128 is selected to tune the first antenna to resonate at ultra high frequencies in a frequency range of 400 MHz to 550 MHz. The method further includes connecting a second capacitor 130 to the metallic coating 118 across a center leg of the second meandering slot line, wherein a capacitance of the second capacitor 130 is selected to tune the second antenna to resonate at ultra high frequencies in the frequency range of 400 MHz to 550 MHz.

The method further includes defining a first axis 114 of the circuit board 102 which is perpendicular to the central axis and extends from the first edge 104 to the second edge, wherein the first axis 114 is located one third of a distance from the third edge 108 to the fourth edge 110, between the third edge 108 and the central axis 112, and wherein the first axis 114 bisects the center leg of the first meandering slot line M1, defining a second axis of the circuit board 102 which is parallel to the central axis 112 and extends from the first edge 104 to the second edge, wherein the second axis is located two thirds of the distance from the third edge 108 to the fourth edge 110, between the fourth edge 110 and the central axis 112, and wherein the second axis bisects the center leg of the second meandering slot line M2, forming the first meandering slot line by forming a first set of nine legs, including: a first leg which begins at an intersection of the central axis 112 and the first axis 114 in the first region, wherein the first leg extends at a first angle from the central axis 112 toward the second axis and ends at the second axis, a second leg connected to the first leg at a second angle, wherein the second leg extends along the second axis, around the first edge 104, and towards the first end of the metallic coating 118, a third leg connected to the second leg at a third angle, wherein the third leg extends towards the first end of the metallic coating 118, a fourth leg connected to the third leg at a fourth angle, wherein the fourth leg extends away from the first end of the metallic coating 118, around the first edge 104 and through the first region towards the central axis 112 for a distance in the first region equal to one third of a distance between the first edge 104 and the central axis 112, wherein the fourth leg is parallel to the second leg and located halfway between the first axis 114 and the second axis, the center leg of the first meandering slot connected to the fourth leg by a 90 degree angle, wherein the center leg of the first meandering slot extends towards the fourth edge 110 to a point equidistant between the fourth edge 110 and the first axis 114, a fifth leg connected to the center leg of the first meandering slot by a 90 degree angle, wherein the fifth leg extends around the first edge 104 towards the first end of the metallic coating 118, wherein a length of the fifth leg equals a length of the fourth leg, a sixth leg connected to the fifth leg by a fifth angle, wherein the sixth leg extends to the fourth edge 110, a seventh leg connected to the sixth leg at a sixth angle, wherein the seventh leg extends parallel to the fourth edge 110, around the first edge 104, towards the central axis 112 of the first meandering slot, wherein a length of the seventh leg equals a length of the second leg, an eighth leg connected to the seventh leg at a seventh angle, wherein the seventh leg extends towards the first leg and connects with a beginning of the first leg, wherein the second plurality of connected legs includes a second set of nine legs comprising: a ninth leg beginning at an intersection of the central axis 112 and the second axis in the second region, wherein the first leg extends at an eighth angle from the central axis 112 towards the first axis 114 and ends at the first axis 114, a tenth leg connected to the ninth leg at a ninth angle, wherein the tenth leg extends along the second axis, around the second edge, and towards the second end of the metallic coating 118, an eleventh leg connected to the tenth leg at an tenth angle, wherein the eleventh leg extends towards the second end of the metallic coating 118, a twelfth leg connected to the eleventh leg at an eleventh angle, wherein the twelfth leg extends away from the second end of the metallic coating 118, around the second edge 106 and through the second region towards the central axis 112 for a distance in the second region equal to one third of a distance in the second region between the second edge 106 and the central axis 112, wherein the twelfth leg is parallel to the first axis 114 and located halfway between the first axis 114 and the second axis, the center leg of the second meandering slot connected to the twelfth leg by a 90 degree angle, wherein the center leg of the second meandering slot M2 extends towards the third edge 108 to a point in the second region equidistant between the third edge 108 and the second axis, a thirteenth leg connected to the center leg of the second meandering slot by a 90 degree angle, wherein the thirteenth leg extends through the second region around the second edge 106 towards the second end of the metallic coating 118, wherein a length of the thirteenth leg equals a length of the twelfth leg, a fourteenth leg connected to the thirteenth leg by a twelfth angle, wherein the fourteenth leg extends to the third edge, a fifteenth leg connected to the fourteenth leg at a thirteenth angle, wherein the fifteenth leg extends parallel to the third edge, around the second edge, through the second region towards the central axis 112, wherein a length of the fifteenth leg equals a length of the tenth leg, and a sixteenth leg connected to the fifteenth leg at a fourteenth angle, wherein the sixteenth leg extends towards the ninth leg and connects with a beginning of the ninth leg.

The third embodiment is illustrated with respect to FIGS. 1-5. The third embodiment describes a method for transmitting and receiving ultra high frequency (UHF) signals with a miniaturized folded slot-based multiple-input-multipleoutput (MIMO) antenna. The method includes transmitting ultra high frequency (UHF) signals by applying the ultra high frequency (UHF) signals to a first feed horn and a second feed horn formed in a circuit board 102 including: a front side 202 and a back side 204 separated by a dielectric, a first edge 104, a second edge 106 parallel to and opposite the first edge 104, a third edge 108 perpendicular to the first edge 104 and the second edge, a fourth edge 110 parallel to the third edge 108 and opposite the third edge, a central axis 112 parallel to the first edge 104, wherein the central axis 112 bisects the front side 202 such that the front side 202 consists of a first region located between the first edge 104 and the central axis 112 and a second region located between the second edge 106 and the central axis 112, a metallic coating 118 covering the front side 202, a first portion of the back side 204 and a second portion of the back side 204, wherein the metallic coating 118 is folded over the first edge 104 and covers the first portion and wherein the metallic coating 118 is folded over the second edge 106 and covers the second portion, a first meandering slot line M1 formed in the metallic sheet between the central axis 112 and the first end, wherein the first meandering slot line M1 is configured as a first antenna, a second meandering slot line M2 formed in the metallic coating 118 between the central axis 112 and the second end, wherein the second meandering slot line M2 configured as a second antenna, a first metallic feed horn 124 and a second metallic feed horn 126 located on the back side 204 in a gap region between the first edge 104 and the second edge, and a plurality of capacitors configured to tune a first resonance frequency of the first antenna and a second resonance frequency of the second antenna. The method further includes receiving the ultra high frequency signals by the first meandering slot and the second meandering slot, wherein the ultra high frequency signals cause the first antenna and the second antenna to resonate, receiving the resonating signals of the first antenna by the first feed horn and receiving the resonating signals of the second antenna by the second feed horn, generating first current signals by the first feed horn from the resonating signals of the first antenna, and generating second current signals by the second feed horn from the resonating signals of the second antenna.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A miniaturized folded slot-based multiple-input-multiple-output (MIMO) antenna for ultra high frequency (UHF) bands, comprising:
    a circuit board having a front side and a back side separated by a dielectric material, a first edge, a second edge parallel to and opposite the first edge, a third edge perpendicular to the first edge and the second edge, a fourth edge parallel to the third edge and opposite the third edge; a central axis parallel to the first edge, wherein the central axis bisects the front side such that the front side consists of a first region located between the first edge and the central axis and a second region located between the second edge and the central axis;
    a metallic coating covering the front side, a first portion of the back side and a second portion of the back side, wherein the metallic coating is folded over the first edge and covers the first portion and wherein the metallic coating is folded over the second edge and covers the second portion;
    a first meandering slot line formed in the metallic coating between the central axis and the first edge, wherein the first meandering slot line is configured as a first antenna;
    a second meandering slot line formed in the metallic coating between the central axis and the second edge, wherein the second meandering slot line is configured as a second antenna;
    a first metallic feed horn and a second metallic feed horn located on the back side in a gap region between the first edge and the second edge; and
    a plurality of capacitors configured to tune a first resonance frequency of the first antenna and a second resonance frequency of the second antenna.

2. The miniaturized folded slot-based MIMO antenna of claim 1, wherein a width of the circuit board parallel to the first edge is less than or equal to 100 mm and a length of the circuit board parallel to the third edge is less than or equal to 100 mm.

3. The miniaturized folded slot-based MIMO antenna of claim 1, wherein the plurality of capacitors comprises:
    a first capacitor connected across a center leg of the first meandering slot line; and
    a second capacitor connected across a center leg of the second meandering slot line.

4. The miniaturized folded slot-based MIMO antenna of claim 3, wherein the first antenna is configured to resonate at signal frequencies dependent on a capacitance of the first capacitor and the second antenna is configured to resonate at signal frequencies dependent on a capacitance of the second capacitor.

5. The miniaturized folded slot-based MIMO antenna of claim 4, wherein the first antenna and the second antenna are each configured to resonate at signal frequencies in the range of 400 MHz to 550 MHz.

6. The miniaturized folded slot-based MIMO antenna of claim 3, wherein the first capacitor and the second capacitor are variable capacitors.

7. The miniaturized folded slot-based MIMO antenna of claim 3, further comprising:
    a first feed line connected to the fourth edge in the gap region;
    a feed end of the first feed horn connected to the first feed line;
    a second feed line connected to the third edge in the gap region;
    a feed end of the second feed horn connected to the second feed line;
    a horn end of the first feed horn angled towards the first edge; and
    a horn end of the second feed horn angled towards the second edge.

8. The miniaturized folded slot-based MIMO antenna of claim 7, further comprising:
    a first plurality of connected legs which form the first meandering slot line; and
    a second plurality of connected legs which form the second meandering slot line.

9. The miniaturized folded slot-based MIMO antenna of claim 8, further comprising:
    a first axis of the circuit board perpendicular to the central axis and extending from the first edge to the second edge, wherein the first axis bisects the center leg of the first meandering slot line; and
    a second axis of the circuit board parallel to the first axis and extending from the first edge to the second edge, wherein the second axis bisects the center leg of the second meandering slot line.

10. The miniaturized folded slot-based MIMO antenna of claim 9, wherein the first plurality of connected legs includes a first set of nine legs comprising:
a first leg which begins at an intersection of the central axis and the first axis in the first region, wherein the first leg extends at a first angle from the central axis toward the second axis and ends at the second axis;
a second leg connected to the first leg at a second angle, wherein the second leg extends along the second axis, around the first edge, and towards the first end;
a third leg connected to the second leg at a third angle, wherein the third leg extends towards the first end;
a fourth leg connected to the third leg at a fourth angle, wherein the fourth leg extends away from the first end, around the first edge and through the first region towards the central axis for a distance in the first region equal to one third of a distance between the first edge and the central axis, wherein the fourth leg is parallel to the second leg and located halfway between the first axis and the second axis;
the center leg of the first meandering slot connected to the fourth leg by a 90 degree angle, wherein the center leg of the first meandering slot extends towards the fourth edge to a point equidistant between the fourth edge and the first axis;
a fifth leg connected to the center leg of the first meandering slot by a 90 degree angle, wherein the fifth leg extends around the first edge towards the first end, wherein a length of the fifth leg equals a length of the fourth leg;
a sixth leg connected to the fifth leg by a fifth angle, wherein the sixth leg extends to the fourth edge;
a seventh leg connected to the sixth leg at a sixth angle, wherein the seventh leg extends parallel to the fourth edge, around the first edge, towards the central axis of the first meandering slot, wherein a length of the seventh leg equals a length of the second leg; and
an eighth leg connected to the seventh leg at a seventh angle, wherein the seventh leg extends towards the first leg and connects with a beginning of the first leg.

11. The miniaturized folded slot-based MIMO antenna of claim 10, wherein the first angle is 45 degrees, the second angle is 135 degrees, the third angle is 135 degrees, the fourth angle is 45 degrees, the fifth angle is 45 degrees, the sixth angle is 135 degrees, and the seventh angle is 135 degrees.

12. The miniaturized folded slot-based MIMO antenna of claim 10, wherein the horn end of the first metallic feed horn makes an angle of 135 degrees with the first feed line and the horn end of the first metallic feed horn is pointed towards the first end between the fourth and the fifth legs.

13. The miniaturized folded slot-based MIMO antenna of claim 10, wherein the first capacitor is located across the center leg of the first meandering slot at an intersection with the first axis.

14. The miniaturized folded slot-based MIMO antenna of claim 10, wherein the second plurality of connected legs includes a second set of nine legs comprising:
a ninth leg beginning at an intersection of the central axis and the second axis in the second region, wherein the ninth leg extends at an eighth angle from the central axis towards the first axis and ends at the first axis;
a tenth leg connected to the ninth leg at a ninth angle, wherein the tenth leg extends along the second axis, around the second edge, and towards the second end;
an eleventh leg connected to the tenth leg at an tenth angle, wherein the eleventh leg extends towards the second end;
a twelfth leg connected to the eleventh leg at an eleventh angle, wherein the twelfth leg extends away from the second end, around the second edge and through the second region towards the central axis for a distance in the second region equal to one third of a distance in the second region between the second edge and the central axis, wherein the twelfth leg is parallel to the first axis and located halfway between the first axis and the second axis;
the center leg of the second meandering slot connected to the twelfth leg by a 90 degree angle, wherein the center leg of the second meandering slot extends towards the third edge to a point in the second region equidistant between the third edge and the second axis;
a thirteenth leg connected to the center leg of the second meandering slot by a 90 degree angle, wherein the thirteenth leg extends through the second region around the second edge towards the second end, wherein a length of the thirteenth leg equals a length of the twelfth leg;
a fourteenth leg connected to the thirteenth leg by a twelfth angle, wherein the fourteenth leg extends to the third edge;
a fifteenth leg connected to the fourteenth leg at a thirteenth angle, wherein the fifteenth leg extends parallel to the third edge, around the second edge, through the second region towards the central axis, wherein a length of the fifteenth leg equals a length of the tenth leg; and
a sixteenth leg connected to the fifteenth leg at a fourteenth angle, wherein the sixteenth leg extends towards the ninth leg and connects with a beginning of the ninth leg.

15. The miniaturized folded slot-based MIMO antenna of claim 14, wherein the eighth angle is 45 degrees, the ninth angle is 135 degrees, the tenth angle is 135 degrees, the eleventh angle is 45 degrees, the twelfth angle is 45 degrees, the thirteenth angle is 135 degrees and the fourteenth angle is 135 degrees.

16. The miniaturized folded slot-based MIMO antenna of claim 14, wherein the horn of the second metallic feed horn makes an angle of 135 degrees with the second feed line and the horn end of the second metallic feed horn is pointed towards the second end between the twelfth and the thirteenth legs.

17. The miniaturized folded slot-based MIMO antenna of claim 14, wherein the second capacitor is located across the center leg of the second meandering slot at an intersection with the second axis.

18. A method for making a miniaturized folded slot-based MIMO antenna, comprising:
obtaining a dielectric circuit board of dimensions of less than or equal to 100×100 $mm^2$, the dielectric circuit board having a metallic coating on a front side, on a back side, on a first edge and on a second edge parallel to the first edge;
defining a central axis of the dielectric circuit board halfway between the first edge and the second edge;
defining a first region of the dielectric circuit board between the central axis and the first edge and located between a third edge perpendicular to the first edge and a fourth edge parallel to the third edge;

defining a second region of the dielectric circuit board between the central axis and the second edge and located between the third edge and the fourth edge;

forming, by a laser milling process, a first antenna having a first meandering slot line in the metallic coating, wherein the first meandering slot line begins at the central axis, extends over the first region and the first edge and onto the back side;

forming, by the laser milling process, a second antenna having a second meandering slot line in the metallic coating, wherein the second meandering slot line begins at the central axis, extends over the second region and the second edge and onto the back side;

forming, by the laser milling process, a first metallic feed horn and a second metallic feed horn surrounded by a gap region on the back side between the first meandering slot line and the second meandering slot line, wherein a horn end of the first feed horn points toward the first meandering slot line at a first end of the metallic coating, and a horn end of the second feed horn points toward the second meandering slot line at a second end of the metallic coating;

connecting a first feed line to the first feed horn;

connecting a second feed line to the second feed horn;

connecting a first capacitor to the metallic coating across a center leg of the first meandering slot line, wherein a capacitance of the first capacitor is selected to tune the first antenna to resonate at ultra high frequencies in a frequency range of 400 MHz to 550 MHz; and connecting a second capacitor to the metallic coating across a center leg of the second meandering slot line, wherein a capacitance of the second capacitor is selected to tune the second antenna to resonate at ultra high frequencies in the frequency range of 400 MHz to 550 MHz.

19. The method of claim 18, further comprising:

defining a first axis of the dielectric circuit board which is perpendicular to the central axis and extends from the first edge to the second edge, wherein the first axis is located one third of a distance from the third edge to the fourth edge, between the third edge and the central axis, and wherein the first axis bisects the center leg of the first meandering slot line;

defining a second axis of the dielectric circuit board which is parallel to the central axis and extends from the first edge to the second edge, wherein the second axis is located two thirds of the distance from the third edge to the fourth edge, between the fourth edge and the central axis, and wherein the second axis bisects the center leg of the second meandering slot line;

forming the first meandering slot line by forming a first set of nine legs, including:
- a first leg which begins at an intersection of the central axis and the first axis in the first region, wherein the first leg extends at a first angle from the central axis toward the second axis and ends at the second axis;
- a second leg connected to the first leg at a second angle, wherein the second leg extends along the second axis, around the first edge, and towards the first end of the metallic coating;
- a third leg connected to the second leg at a third angle, wherein the third leg extends towards the first end of the metallic coating;
- a fourth leg connected to the third leg at a fourth angle, wherein the fourth leg extends away from the first end of the metallic coating, around the first edge and through the first region towards the central axis for a distance in the first region equal to one third of a distance between the first edge and the central axis, wherein the fourth leg is parallel to the second leg and located halfway between the first axis and the second axis;
- the center leg of the first meandering slot connected to the fourth leg by a 90 degree angle, wherein the center leg of the first meandering slot extends towards the fourth edge to a point equidistant between the fourth edge and the first axis;
- a fifth leg connected to the center leg of the first meandering slot by a 90 degree angle, wherein the fifth leg extends around the first edge towards the first end of the metallic coating, wherein a length of the fifth leg equals a length of the fourth leg;
- a sixth leg connected to the fifth leg by a fifth angle, wherein the sixth leg extends to the fourth edge;
- a seventh leg connected to the sixth leg at a sixth angle, wherein the seventh leg extends parallel to the fourth edge, around the first edge, towards the central axis of the first meandering slot, wherein a length of the seventh leg equals a length of the second leg;
- an eighth leg connected to the seventh leg at a seventh angle, wherein the seventh leg extends towards the first leg and connects with a beginning of the first leg;

wherein the second plurality of connected legs includes a second set of nine legs comprising:
- a ninth leg beginning at an intersection of the central axis and the second axis in the second region, wherein the ninth leg extends at an eighth angle from the central axis towards the first axis and ends at the first axis;
- a tenth leg connected to the ninth leg at a ninth angle, wherein the tenth leg extends along the second axis, around the second edge, and towards the second end of the metallic coating;
- an eleventh leg connected to the tenth leg at a tenth angle, wherein the eleventh leg extends towards the second end of the metallic coating;
- a twelfth leg connected to the eleventh leg at an eleventh angle, wherein the twelfth leg extends away from the second end of the metallic coating, around the second edge and through the second region towards the central axis for a distance in the second region equal to one third of a distance in the second region between the second edge and the central axis, wherein the twelfth leg is parallel to the first axis and located halfway between the first axis and the second axis;
- the center leg of the second meandering slot connected to the twelfth leg by a 90 degree angle, wherein the center leg of the second meandering slot extends towards the third edge to a point in the second region equidistant between the third edge and the second axis;
- a thirteenth leg connected to the center leg of the second meandering slot by a 90 degree angle, wherein the thirteenth leg extends through the second region around the second edge towards the second end of the metallic coating, wherein a length of the thirteenth leg equals a length of the twelfth leg;
- a fourteenth leg connected to the thirteenth leg by a twelfth angle, wherein the fourteenth leg extends to the third edge;
- a fifteenth leg connected to the fourteenth leg at a thirteenth angle, wherein the fifteenth leg extends parallel to the third edge, around the second edge, through the second region towards the central axis, wherein a length of the fifteenth leg equals a length of the tenth leg; and a sixteenth leg connected to the fifteenth leg at a fourteenth angle, wherein the sixteenth leg extends towards the ninth leg and connects with a beginning of the ninth leg.

20. A method for transmitting and receiving ultra high frequency (UHF) signals with a miniaturized folded slot-based multiple-input-multiple-output (MIMO) antenna, comprising:

transmitting ultra high frequency (UHF) signals by applying the ultra high frequency (UHF) signals to a first feed horn and a second feed horn formed in a dielectric circuit board including:

a front side and a back side separated by a dielectric, a first edge, a second edge parallel to and opposite the first edge, a third edge perpendicular to the first edge and the second edge, a fourth edge parallel to the third edge and opposite the third edge; a central axis parallel to the first edge, wherein the central axis bisects the front side such that the front side consists of a first region located between the first edge and the central axis and a second region located between the second edge and the central axis, a metallic coating covering the front side, a first portion of the back side and a second portion of the back side, wherein the metallic coating is folded over the first edge and covers the first portion and wherein the metallic coating is folded over the second edge and covers the second portion, a first meandering slot line formed in the metallic sheet between the central axis and the first edge, wherein the first meandering slot line is configured as a first antenna, a second meandering slot line formed in the metallic coating between the central axis and the second edge, wherein the second meandering slot line a configured as a second antenna, a first metallic feed horn and a second metallic feed horn located on the back side in a gap region between the first edge and the second edge, and a plurality of capacitors configured to tune a first resonance frequency of the first antenna and a second resonance frequency of the second antenna;

receiving the ultra high frequency signals by the first meandering slot and the second meandering slot, wherein the ultra high frequency signals cause the first antenna and the second antenna to resonate;

receiving the resonating signals of the first antenna by the first metallic feed horn and receiving the resonating signals of the second antenna by the second metallic feed horn;

generating first current signals by the first metallic feed horn from the resonating signals of the first antenna; and generating second current signals by the second metallic feed horn from the resonating signals of the second antenna.

* * * * *